United States Patent
Marineau-Mes et al.

(10) Patent No.: US 10,715,727 B2
(45) Date of Patent: Jul. 14, 2020

(54) SYNTHETIC LONG EXPOSURE IMAGE WITH OPTIONAL ENHANCEMENT USING A GUIDE IMAGE

(71) Applicant: Apple Inc., Cupertino, CA (US)

(72) Inventors: Sebastien Marineau-Mes, San Francisco, CA (US); Charles A. Mezak, San Francisco, CA (US); Arwen Bradley, Portland, OR (US); Alex T. Nelson, Portland, OR (US); Douglas P. Mitchell, Lake Forest Park, WA (US); Claus Moelgaard, Los Gatos, CA (US); Jason Klivington, Portland, OR (US); Rudolph van der Merwe, Portland, OR (US); Zahra Sadeghipoor Kermani, Cupertino, CA (US); Farhan Baqai, Fremont, CA (US); Todd Sachs, Palo Alto, CA (US); Paul Hubel, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/978,128

(22) Filed: May 12, 2018

(65) Prior Publication Data
US 2018/0338086 A1 Nov. 22, 2018

Related U.S. Application Data

(60) Provisional application No. 62/514,226, filed on Jun. 2, 2017, provisional application No. 62/506,729, filed on May 16, 2017.

(51) Int. Cl.
*G06T 7/207* (2017.01)
*H04N 5/232* (2006.01)
(Continued)

(52) U.S. Cl.
CPC ....... *H04N 5/23267* (2013.01); *G06T 3/0068* (2013.01); *G06T 3/40* (2013.01);
(Continued)

(58) Field of Classification Search
CPC .. H04N 5/23267; H04N 5/23232; G06T 5/50; G06T 5/003; G06T 3/40; G06T 3/0068;
(Continued)

(56) References Cited

U.S. PATENT DOCUMENTS 8,169,484 B2 * 5/2012 Silberstein ........... H04N 1/0035
348/157
9,836,831 B1 * 12/2017 Krishnaswamy ......... G06T 5/20
(Continued)

OTHER PUBLICATIONS

Notice of Allowance for U.S. Appl. No. 15/798,114 dated Jan. 17, 2019.

*Primary Examiner* — Hung H Lam
(74) *Attorney, Agent, or Firm* — Fernando & Partners, LLP

(57) ABSTRACT

In various implementations a method includes obtaining a plurality of source images, stabilizing the plurality of source images to generate a plurality of stabilized images, and averaging the plurality of stabilized image to generate a synthetic long exposure image. In various implementations, stabilizing the plurality of source images includes: selecting one of the plurality of source images to serve as a reference frame; and registering others of the plurality of source images to the reference frame by applying a perspective transformation to others of the plurality of the source images.

20 Claims, 14 Drawing Sheets

(51) Int. Cl.
*G06T 7/33* (2017.01)
*G06T 3/00* (2006.01)
*G06T 3/40* (2006.01)
*G06T 5/00* (2006.01)
*G06T 5/50* (2006.01)

(52) U.S. Cl.
CPC ............... *G06T 5/003* (2013.01); *G06T 5/50* (2013.01); *G06T 7/207* (2017.01); *G06T 7/337* (2017.01); *G06T 2200/24* (2013.01); *G06T 2207/10016* (2013.01); *G06T 2207/10024* (2013.01); *G06T 2207/20016* (2013.01); *G06T 2207/20028* (2013.01); *G06T 2207/20216* (2013.01); *G06T 2207/20221* (2013.01); *G06T 2207/30201* (2013.01)

(58) Field of Classification Search
CPC ................. G06T 7/337; G06T 7/207; G06T 2207/10024; G06T 2200/24; G06T 2207/20221; G06T 2207/20016; G06T 2207/10016; G06T 2207/30201; G06T 2207/20028; G06T 2207/20216
See application file for complete search history.

(56) References Cited

U.S. PATENT DOCUMENTS

| | | | | |
|---|---|---|---|---|
| 2012/0044381 A1* | 2/2012 | Jannard | ................ | H04N 5/235 348/229.1 |
| 2014/0362256 A1* | 12/2014 | Schulze | ............ | H04N 5/23277 348/231.99 |
| 2014/0363087 A1* | 12/2014 | Tico | ........................ | G06T 5/003 382/195 |
| 2017/0091908 A1 | 3/2017 | Takeda et al. | | |

\* cited by examiner

SYNTHETIC LONG EXPOSURE IMAGE WITH OPTIONAL ENHANCEMENT USING A GUIDE IMAGE

RELATED APPLICATION

This application claims priority to U.S. Provisional Patent Application No. 62/514,226, filed on Jun. 2, 2017, entitled "Synthetic Long Exposure Image with Optional Enhancement Using a Guide Image," and U.S. Provisional Patent Application No. 62/506,729, filed on May 16, 2017, entitled "Target Image Quality Enhancement Using A Guide Image," the entire contents of both of which are incorporated herein by reference.

TECHNICAL FIELD

The present disclosure relates generally to image processing, and in particular, to generating a synthetic long exposure image and, optionally, enhancing the quality of the synthetic long exposure image using a guide image.

BACKGROUND

Electronic devices including a camera can capture a sequence of images. However, in various circumstances, the sequence of images are compressed (which may include downscaling) in the spatial and/or temporal domains in order to efficiently process, store, or transmit the images. In many cases, this compression results in loss of details, blurry edges, blocking artifacts, or otherwise degrades the quality of the image. In many cases, the compression is lossy and irreversible.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
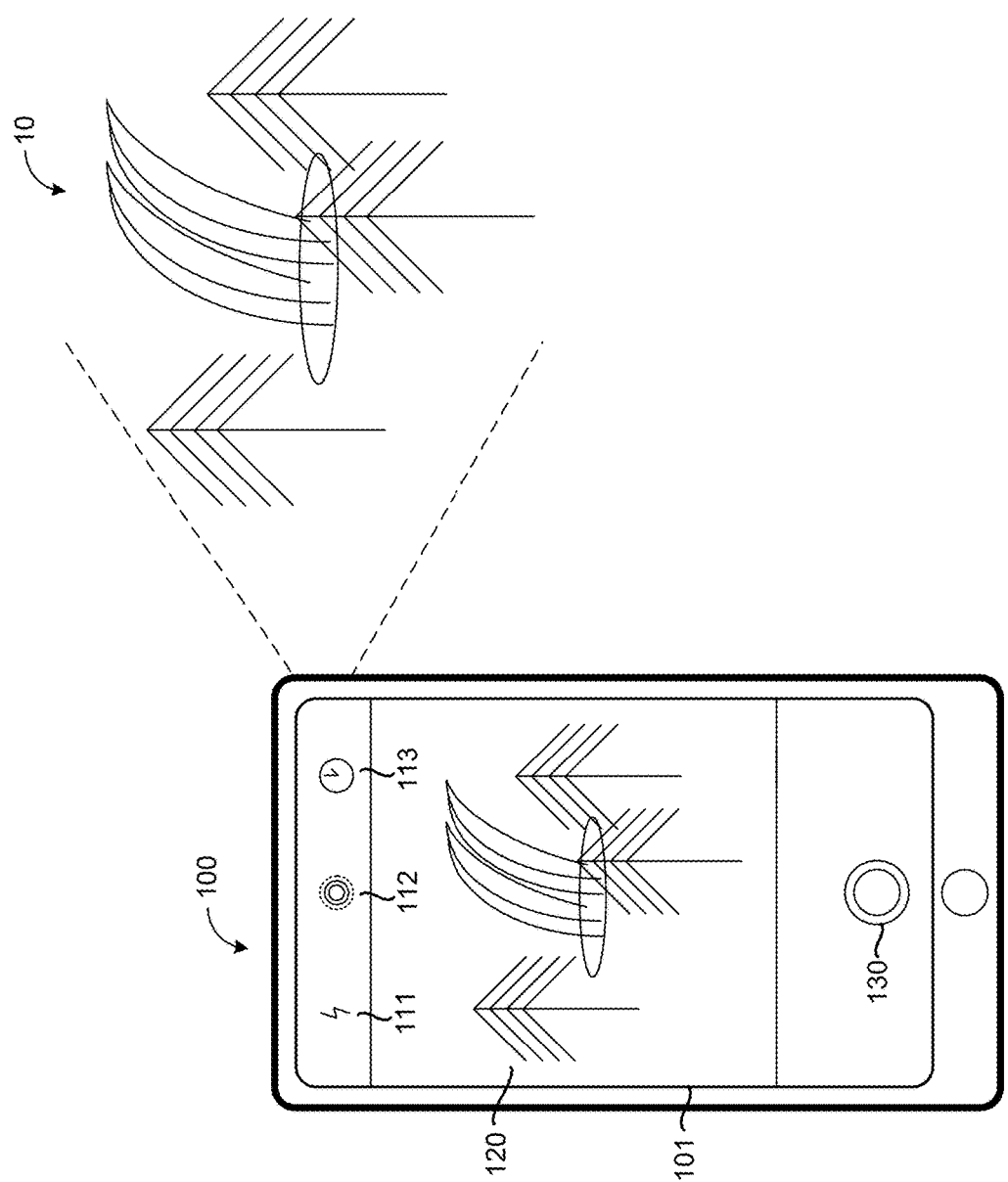
FIG. 1 illustrates an electronic device surveying a scene.

In accordance with common practice, various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

Although images may be compressed in a manner in which information is lost, in some circumstances, it is possible to retrieve some of the lost information of a low-quality image (such as a compressed image) using a high-quality image (such as an uncompressed image) with at least partially similar content.

Described herein are methods and system for merging a low-quality, high-contextual-relevance image with a high-quality, low-contextual-relevance image to create a high-quality, high-contextual-relevance image. As one example, a sequence of low-quality images is used to generate a low-quality synthetic long exposure image. The low-quality synthetic long exposure image can be merged with the high-quality image to generate a high-quality synthetic long exposure image. As another example, a low-quality image of a subject at a moment at which their eyes are open can be merged with a high-quality image of the subject at a moment at which their eyes are closed to create a high-quality image at a moment at which their eyes are open. As another example, a low-quality image of a sporting event at a crucial moment (e.g., a buzzer-beater shot of a basketball entering the hoop) can be merged with a high-quality image a second before or after the crucial moment to create a high-quality image at the crucial moment.

The low-quality image and high-quality image can be obtained in a variety of ways. In some embodiments, an image capture device captures, in response to a user trigger, a high-quality image along with a sequence of low-quality images starting at a period before and ending at a period after the high-quality image is taken. In another embodiment, a video stream is compressed (e.g., for efficient processing, storage, or transmission), but periodic frames are uncompressed in order to allow recovery of at least some of information lost in the compression.

It is to be appreciated that the terms "high" and "low", as used herein (e.g., in the terms "high-quality", "high-contextual-relevance", and "high-resolution"), refer not to specific thresholds, but to a relation to each other. Accordingly, a "high-resolution" image need not have a resolution greater than a particular number, but has a higher resolution than a related "low-resolution" image. Likewise, the terms "long"

and "short", as used herein (e.g., in the term "long exposure"), refer not to specific thresholds, but to a relation to each other.

FIG. 1 illustrates an electronic device 100 surveying a scene 10 including some trees (static objects) and a waterfall (a dynamic object). The electronic device 100 includes a touch-sensitive display 101 displaying a graphical user interface of an image capture application. The electronic device 100 includes a camera (not shown) having a field of view encompassing the scene 10.

The graphical user interface displays a number of options affordances 111-113, an image preview window 120, and a capture affordance 130. The image preview window 120 includes a live image of the scene encompassed by the camera's field of view. When the capture affordance 130 is selected (e.g., the location of the capture affordance 130 on the touch-sensitive display 101 is touched by a user), the electronic device 100 captures an image (of the scene depicted in the image preview window 120) using the camera.

The graphical user interface displays a flash affordance 111 that can be used by a user to set a flash setting. When the flash setting is set to "ON," the electronic device 100 captures an image while triggering a flash of the camera when the capture affordance 130 is selected. When the flash setting is set to "OFF," the electronic device 100 captures an image when the capture affordance 130 is selected without triggering a flash. When the flash setting is set to "AUTO," the electronic device 100 determines whether or not to trigger the flash (e.g., based on lighting conditions of the scene 10) when capturing an image in response to detecting selection of the capture affordance 130.

The graphical user interface displays a timer affordance 113 that can be used by a user to set a delay period such that when the capture affordance 130 is selected, the electronic device 100 captures an image using the camera after the delay period.

The graphical user interface displays a burst affordance 112 that can be used by a user to enter (or exit) a burst photo mode. When in the burst photo mode, the electronic device 100 continually captures a sequence of low-quality images using the camera, saving the most recent set of images in a buffer. In various implementations, the buffer includes approximately 1.5 seconds of images at approximately 15 frames per second. In various implementations, the buffer includes approximately 1.5 seconds of image at 20, 24, or 30 frames per second. In response to detecting selection of the capture affordance 130, the electronic device captures a high-quality image using the camera and captures another sequence of low-quality images using the camera. In various implementations, the sequence of low-quality images captured after selection of the capture affordance 130 also includes approximately 1.5 seconds of images at 15 frames per second (or at 20, 24, or 30 frames per second). The electronic device 100 saves the sequence of low-quality images in the buffer, the captured high-quality image, and the sequence of low-quality images captured after the capture affordance 130 was selected.

Thus, when in burst photo mode, in response to detecting selection of the capture affordance 130, the electronic device 100 saves a plurality of low-quality images and a single high-quality image. In various implementations, the electronic device captures (and saves) multiple high-quality images, such as an additional high-quality image captured after the second sequence of low-quality images.

Figure 2:
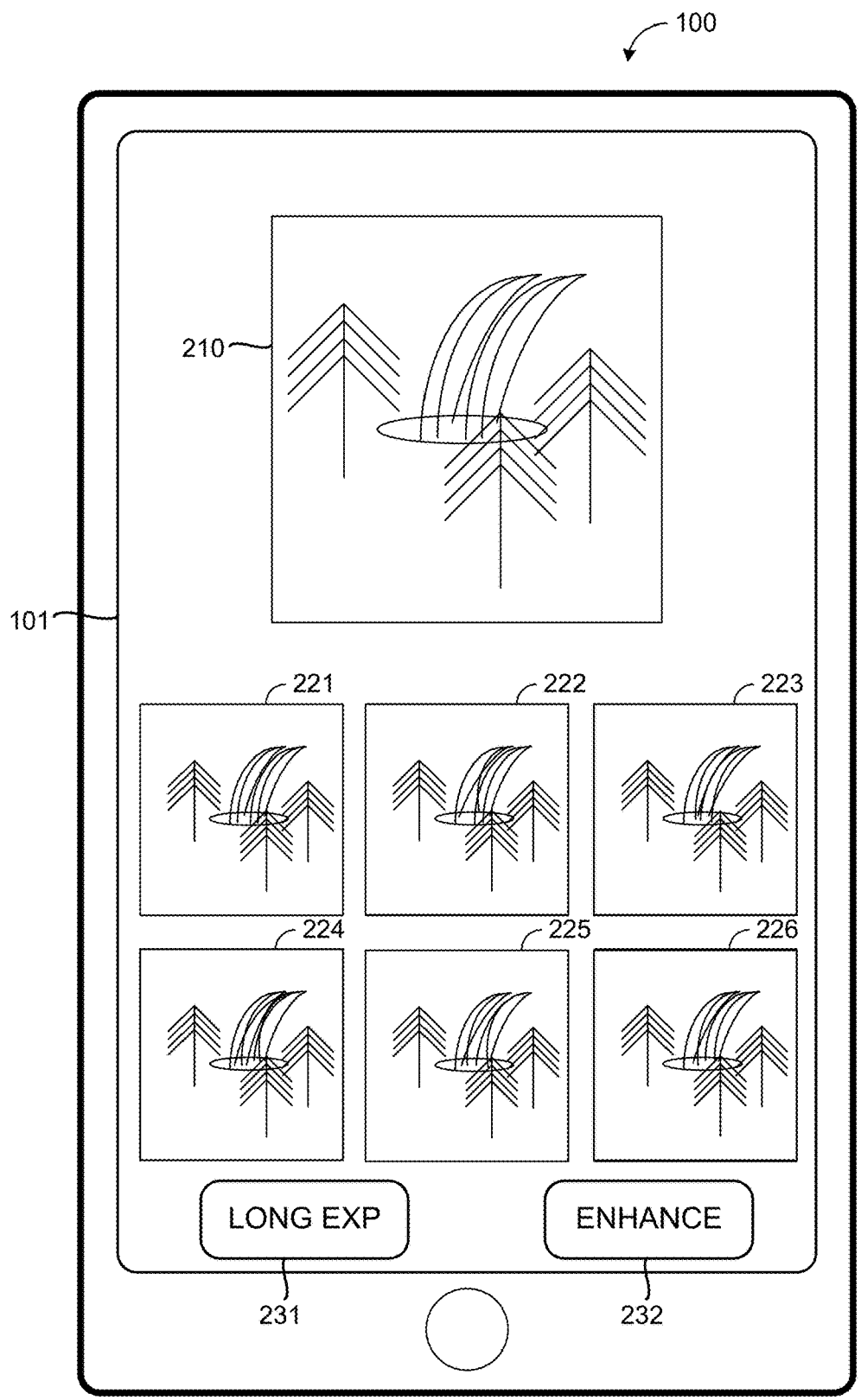
FIG. 2 illustrates the electronic device of FIG. 1 displaying a burst processing user interface on the touch-sensitive display.

FIG. 2 illustrates the electronic device 100 of FIG. 1 displaying a burst processing user interface on the touch-sensitive display 101. It is to be appreciated that the burst processing user interface illustrated in FIG. 2 (and in subsequent figures) is one example of a user interface for processing a plurality of images. In various implementations, different user interfaces are presented to generate a synthetic long exposure image (or to enhance a target image). In various implementations, a synthetic long exposure image is generated by the electronic device 100 automatically, without presenting options via a user interface.

In FIG. 2, the burst processing user interface includes a representation 210 of a high-quality image and representations 221-226 of various low-quality images. As described above, the high-quality image and the low-quality images can be obtained in a burst photo mode. The burst processing user interface includes a long exposure affordance 231 that, when selected, generates a synthetic long exposure image based on the low-quality images. The burst processing user interface further includes an enhance affordance 232 that, when selected, generates an enhanced image based on a selected one of the low-quality images using the high-quality image as a guide.

The representations 221-226 of the low-quality images illustrate the scene 10 at various points in time. In each of the representations 221-226, the trees (as static objects) are substantially similar, whereas the waterfall (as a dynamic object) is relatively different. After a user selects the long exposure affordance 231 (e.g., touches the touch-sensitive display 101 at the location of the long exposure affordance 231), the electronic device 100 generates a synthetic long exposure image based on the low-quality images.

Long exposure photography is an aesthetically pleasing creative way of capturing scenes containing motion, especially of fluid like phenomena like waterfalls, rivers, surface waves and ripples of bodies of water to name but a few. In a long exposure image, a dynamic object does not appear frozen in time as would occur in an image with a short exposure time, but is rather integrated into a silky smooth rendition that still maintains the essence of the motion, but presented in a much more continuous and dreamlike fashion. As described below, a synthetic long exposure image can be generated from a sequence of short exposure images.

Figure 3:
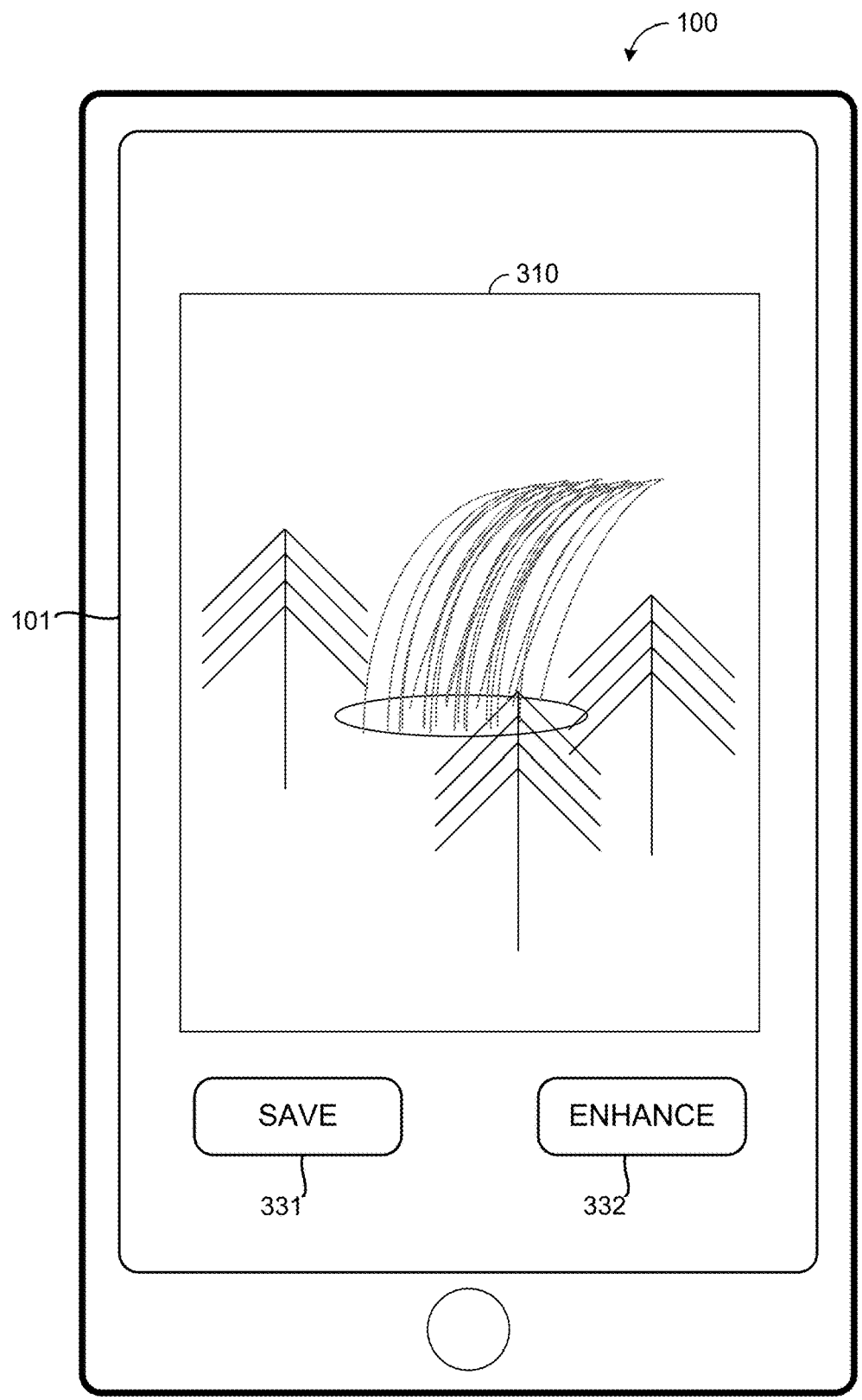
FIG. 3 illustrates the electronic device of FIG. 2 in response to generating a synthetic long exposure image based on a plurality of low-quality images.

FIG. 3 illustrates the electronic device 100 of FIG. 2 in response to generating the synthetic long exposure image based on the low-quality images. Displayed on the touch-sensitive display 101 of the electronic device 100 is a representation 310 of a low-quality synthetic long exposure image. Also displayed is a save affordance 331 that can be used by a user to save the generated low-quality synthetic long exposure image in a memory of the electronic device 100 and an enhance affordance 332 that can be used by the user to generate an enhanced synthetic long exposure image based on the low-quality synthetic long exposure image using the high-quality image (of which a representation 210 is shown in FIG. 2) as a guide image.

Figure 4:
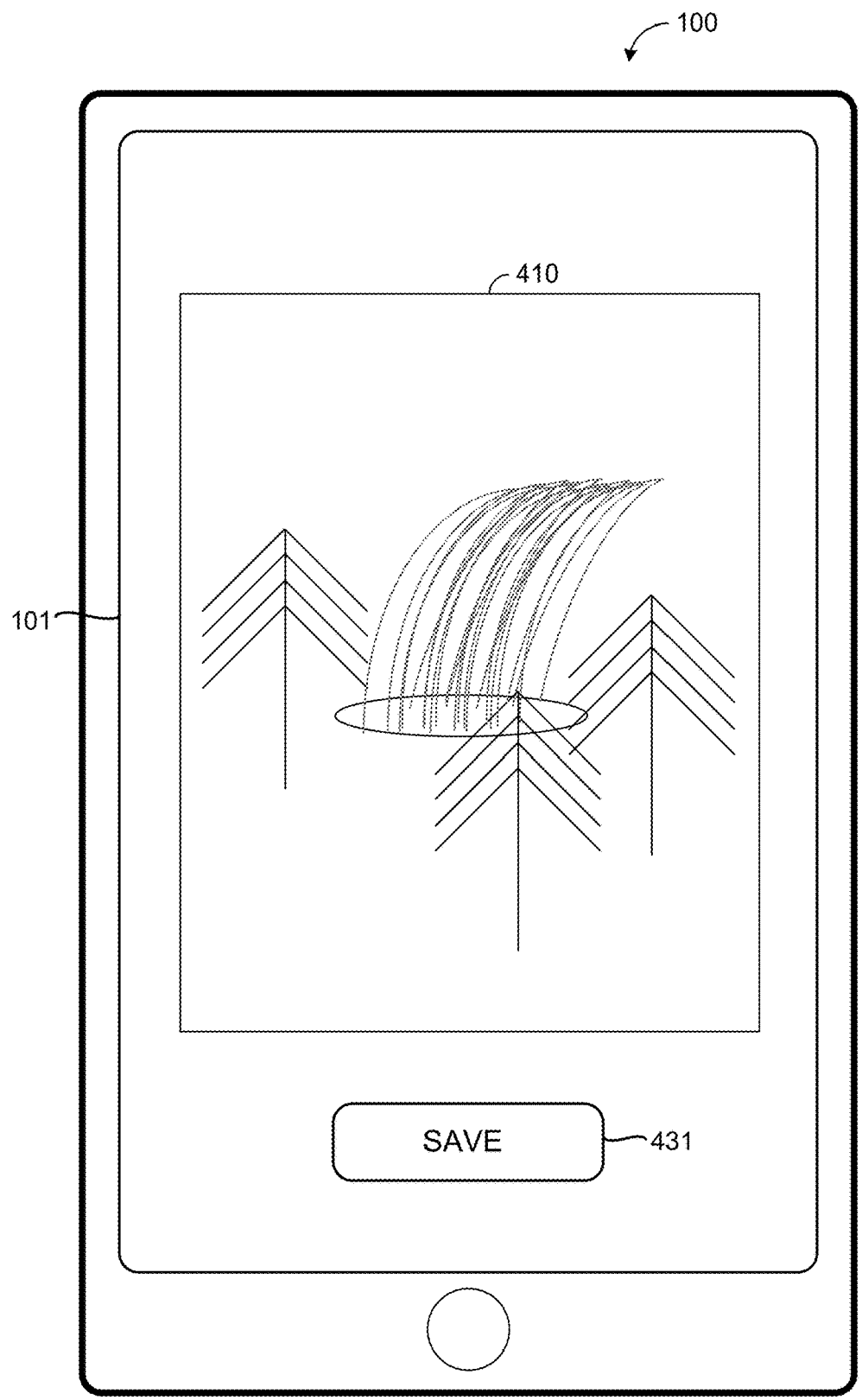
FIG. 4 illustrates the electronic device of FIG. 3 in response to generating an enhanced synthetic long exposure image.

FIG. 4 illustrates the electronic device 100 of FIG. 3 in response to generating an enhanced synthetic long exposure image. Displayed on the touch-sensitive display 101 of the electronic device 100 is a representation 410 of a high-quality synthetic long exposure image. Also displayed is a save affordance 431 that can be used by a user to save the generated high-quality synthetic long exposure image in a memory of the electronic device 100.

Figure 5:
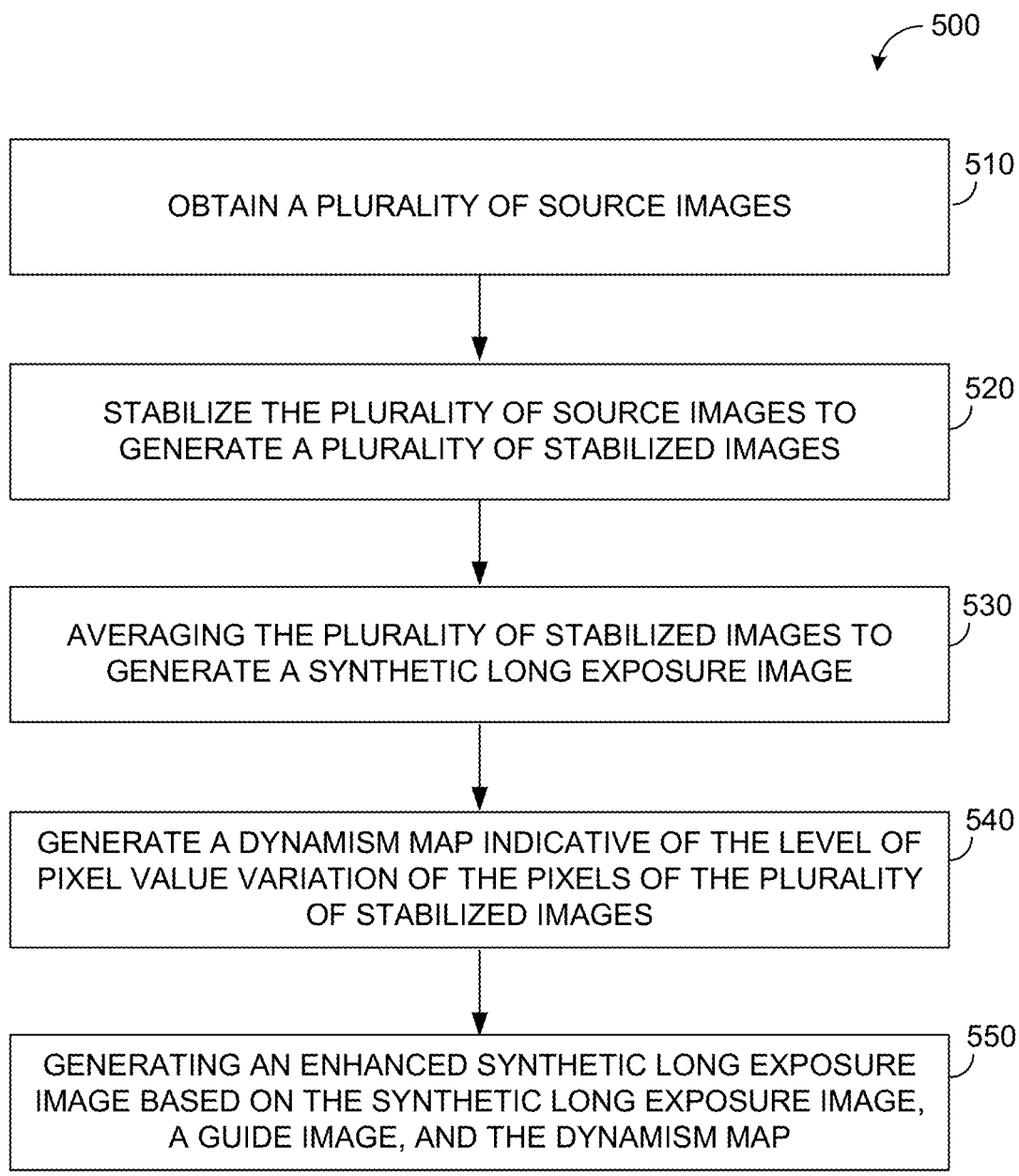
FIG. 5 is a flowchart representation of a method of generating a synthetic long exposure image in accordance with some implementations.

FIG. 5 is a flowchart representation of a method 500 of generating a synthetic long exposure image in accordance with some implementations. In some implementations (and as detailed below as an example), the method 500 is performed by an electronic device (or a portion thereof), such as the electronic device 100 of FIG. 1. In some implementations, the method 500 is performed by processing logic, including hardware, firmware, software, or a combination thereof. In some implementations, the method 500 is performed by a processor executing code stored in a non-transitory computer-readable medium (e.g., a memory). Briefly, the method 500 includes obtaining a plurality of source images, stabilizing the images, and averaging the stabilized images.

The method 500 begins, at block 510, with the electronic device obtaining a plurality of source images. In various implementations, each of the source images has a first resolution and thus comprises a plurality of source pixels having a plurality of corresponding source pixel values. In various implementations, the source pixel values range from 0 to 255. In various implementations, each source pixel is associated with three source pixels values, each corresponding to a color channel. In some embodiments, each source image includes approximately 1.5 megapixels.

In various implementations, obtaining the plurality of source images includes detecting selection of a capture affordance of an image capture user interface while in a burst photo mode and capturing, with a camera, the plurality of source images. In some embodiments, in response to detecting selection of the capture affordance, the electronic device also captures, with the camera, a guide image having a second resolution higher than the first resolution.

The method 500 continues, at block 520, with the electronic device stabilizing the plurality of source images to generate a plurality of stabilized images. In various implementations, stabilizing the plurality of source images includes selecting one of the plurality of source images to serve as a reference frame and registering others of the plurality of source images to the reference frame by applying a perspective transformation to others of the plurality of source images.

In various implementations, registering others of the plurality of source images includes tracking, filtering, and registering a plurality of key-points across the plurality of source images. Thus, in various implementations, applying a perspective transformation involves applying a non-linear transformation, e.g., based on key-point tracking. By transforming each of the plurality of source images into a common coordinate system, when the plurality of stabilized images is displayed in sequence, the stabilization help the resulting video approach the appearance of the scene being captured with a camera on a tripod (e.g., with an unmoving camera).

The method 500 continues, at block 530, with the electronic device 100 averaging the plurality of stabilized images to generate a synthetic long exposure image. In various implementations, averaging the plurality of stabilized images includes determining, for at least one pixel of the plurality of stabilized images, a weighted generalized mean. In various implementations, the weighted generalized mean is determined for a plurality of the pixels, a majority of the pixels, or each of the pixels.

In various implementations, the weighted generalized mean is calculated using the following formula, wherein M(i) is the weighted generalized mean for a pixel i, $I_j(i)$ is the pixel value of pixel i for image j of N stabilized images, $w_j$ is the weight for image j, and p is the generalized mean exponent:

$$M(i) = \left(\sum_{j=1}^{N} w_j I_j^p(i)\right)^{1/p}$$

In various implementations, the sum of the weights equals 1. In various implementations, the weights are constant for each of the plurality of stabilized images (e.g., 1/N). The value of the generalized mean exponent has an effect on the overall look of the synthetic long exposure image, e.g., what gets emphasized. In various implementations, the exponent of the weighted generalized mean is 1 (e.g., when operating in a linear gamma corrected color space) or 2 (e.g., when operating in an sRGB space). When the generalized mean exponent has larger values (e.g., between 10 and 20), the effect of bright pixels in the individual stabilized images will be emphasized, generating a long exposure variant referred to as a "light trail" image. Accordingly, in various implementations, an exponent of the weighted generalized mean is 1. In various implementations, an exponent of the weighted generalized mean is 2. In various implementations, an exponent of the weighted generalized mean is between 10 and 20.

As the plurality of source images have a first resolution, the plurality of stabilized images have the first resolution, and the synthetic long exposure image has the first resolution. As noted above, in various implementations, obtaining the plurality of source images further includes obtaining a guide image having a second resolution higher than the first resolution of the source images. In various implementations, the guide image is used to enhance the synthetic long exposure image having the first resolution to generate an enhanced synthetic long exposure image having the second resolution. In various implementations, the guide image is used to at least partially enhance the synthetic long exposure image to have a resolution between the first resolution and the second resolution. In various implementations, such enhancement is based, in part, on a dynamism map indicative of the level of pixel variation of the pixels of the plurality of stabilized images.

Thus, in some embodiments, the method 500 continues, at block 540, with the electronic device generating a dynamism map indicative of the level of pixel variation of the pixels of the plurality of stabilized images. In various implementations, the dynamism map indicates a degree that a specific pixel (or region) in the synthetic long exposure image corresponds to areas of increased dynamism (more motion) indicated by a lighter grey value (e.g., closer to 1) and which areas correspond to areas of decreased dynamism (little or no motion) indicated by a darker gray value (e.g., closer to 0).

In various implementations, generating a dynamism map includes blurring each of the plurality of stabilized images to generate a plurality of blurred stabilized images. In various implementations, a Gaussian blur is applied to each of the stabilized images to generate the blurred stabilized images. In some circumstances, such as when the stabilized images are approximately 1080p, the standard deviation of the Gaussian blur is approximately 3.

The blurred stabilized images are used to generate a maximum image and a minimum image. The pixel value of each pixel of the maximum image is the maximum of the pixel values of the corresponding pixels (e.g., at the same location) of the plurality of blurred stabilized images. Similarly, the pixel value of each pixel of the minimum image is the minimum of the pixel values of the corresponding pixels of the plurality of blurred stabilized images.

In various implementations, the pixel value of a pixel of the maximum image is a color triplet with a red value equal to the maximum of the red pixel values of the corresponding pixels of the plurality of blurred stabilized images, a green value equal to the maximum of the green pixel values of the corresponding pixels of the plurality of blurred stabilized images, and a blue value equal to the maximum of the blue pixel values of the corresponding pixels of the plurality of blurred stabilized images. Similarly, in various implementations, the pixel value of a pixel of the minimum image is a color triplet with a red value equal to the minimum of the red pixel values of the corresponding pixels of the plurality of blurred stabilized images, a green value equal to the minimum of the green pixel values of the corresponding pixels of the plurality of blurred stabilized images, and a blue value equal to the minimum of the blue pixel values of the corresponding pixels of the plurality of blurred stabilized images.

The maximum image and the minimum image are used to generate, for each pixel of the dynamism map, a plurality of candidate distance metrics. Each of the candidate distance metrics is indicative of a distance between the pixel values of the maximum image pixel values of the minimum image.

In various implementations, for a particular pixel of the dynamism map, the plurality of candidate distance metrics include a first set of candidate distance metrics indicative of distances between the pixel value of the corresponding particular pixel of the maximum image and pixel values of a neighborhood of pixels surrounding the corresponding particular pixel of the minimum image. Accordingly, for a 3×3 neighborhood, the plurality of candidate distance metrics include 9 metrics. In various implementations, for a particular pixel of the dynamism map, the plurality of candidate distance metrics include a second set of candidate distance metrics indicative of distances between the pixel value of the corresponding particular pixel of the minimum image and pixel values of a neighborhood of pixels surrounding the corresponding particular pixel of the maximum image. Accordingly, for a 3×3 neighborhood, the plurality of candidate distance metrics include 9 metrics. In various implementations, for a particular pixel of the dynamism map, the plurality of candidate distance metrics include both the first set of candidate distance metrics and the second set of candidate distance metrics. Accordingly, for 3×3 neighborhoods, the plurality of candidate distance metrics include 18 metrics.

In various implementations, for a particular pixel of the dynamism map, the plurality of candidate distance metrics include a complete set of candidate distance metrics indicative of distances between the pixel values of a first neighborhood of pixels surrounding the corresponding particular pixel of the maximum image and pixel values of a second neighborhood of pixels surrounding the corresponding particular pixel of the minimum image. Accordingly, for 3×3 neighborhoods, the plurality of candidate distance metrics include 81 metrics.

In various implementations, for color images, the candidate distance metrics are color triplets indicative of the distance between each color. For example, as between a first color triplet of $(R_1, G_1, B_1)$ and a second color triplet of $(R_2, G_2, B_2)$, the candidate distance metric is a color triplet of $(|R_1-R_2|, |G_1-G_2|, |B_1-B_2|)$.

In various implementations, for color images, the candidate distance metrics are a single value indicative of a distance in linear color space. For example, as between a first color triplet of $(R_1, G_1, B_1)$ and a second color triplet of $(R_2, G_2, B_2)$, the candidate distance metric $(D_n)$ is calculated as $D_n = \sqrt{(R_1-R_2)^2+(G_1-G_2)^2+(B_1-B_2)^2}$.

For a particular pixel of the dynamism map, a distance metric is determined based on the plurality of candidate distance metrics. In various implementations, the distance metric is a selected one of the candidate distance metrics. For example, in various implementations, the distance metric is the smallest of the candidate distance metrics. As another example, in various implementations, the distance metric is the second smallest of the candidate distance metrics.

In various implementations, the distance metric is color triplet, each color value based on the corresponding color values of the plurality of candidate distance metrics. In various implementations, each color value is a selected one of the corresponding color values of the plurality of candidate distance metrics, such as the smallest corresponding color value.

In various implementations, the distance metric is normalized. In some embodiments, the distance metric is normalized to a single value between 0 and 1. For example, when the distance metric is a single value, a nonlinear logistic squashing function is applied to the distance metric to generate the normalized distance metric (and the value of the particular pixel of the dynamism map). One example of a squashing function, where D' is the normalized distance metric, D is the distance metric, g is a gain constant, and b is an offset constant, is the sigmoid function:

$$D' = \frac{1}{1 + e^{-g(D-b)}}.$$

As another example, when the distance metric is a color triplet, the normalization function, where $D_r$ is the red value of the distance metric, $C_r$ is a red normalizing constant, $D_b$ is the blue value of the distance metric, $C_b$ is a blue normalizing constant, $D_g$ is the green value of the distance metric, and $C_g$ is a green normalizing constant, is:

$$D' = \frac{1}{C_r}D_r + \frac{1}{C_b}D_b + \frac{1}{C_g}D_g.$$

In various implementations, the red normalizing constant, blue normalizing constant, and green normalizing constant are equal. In various implementations, the red normalizing constant, blue normalizing constant, and green normalizing constant are unequal. For example, in various implementations, the green normalizing constant is greater than the red normalizing constant, which is greater than the blue normalizing constant. In one embodiment, the green normalizing constant is approximately three times the red normalizing constant, which is approximately three times the blue normalizing constant.

The method 500 continues, at block 550, with the electronic device generating an enhanced synthetic long exposure image based on the synthetic long exposure image, a guide image, and the dynamism map. One embodiment of enhancing an image, which can be applied to the synthetic long exposure image or any other target image, is described below.

Figure 6:
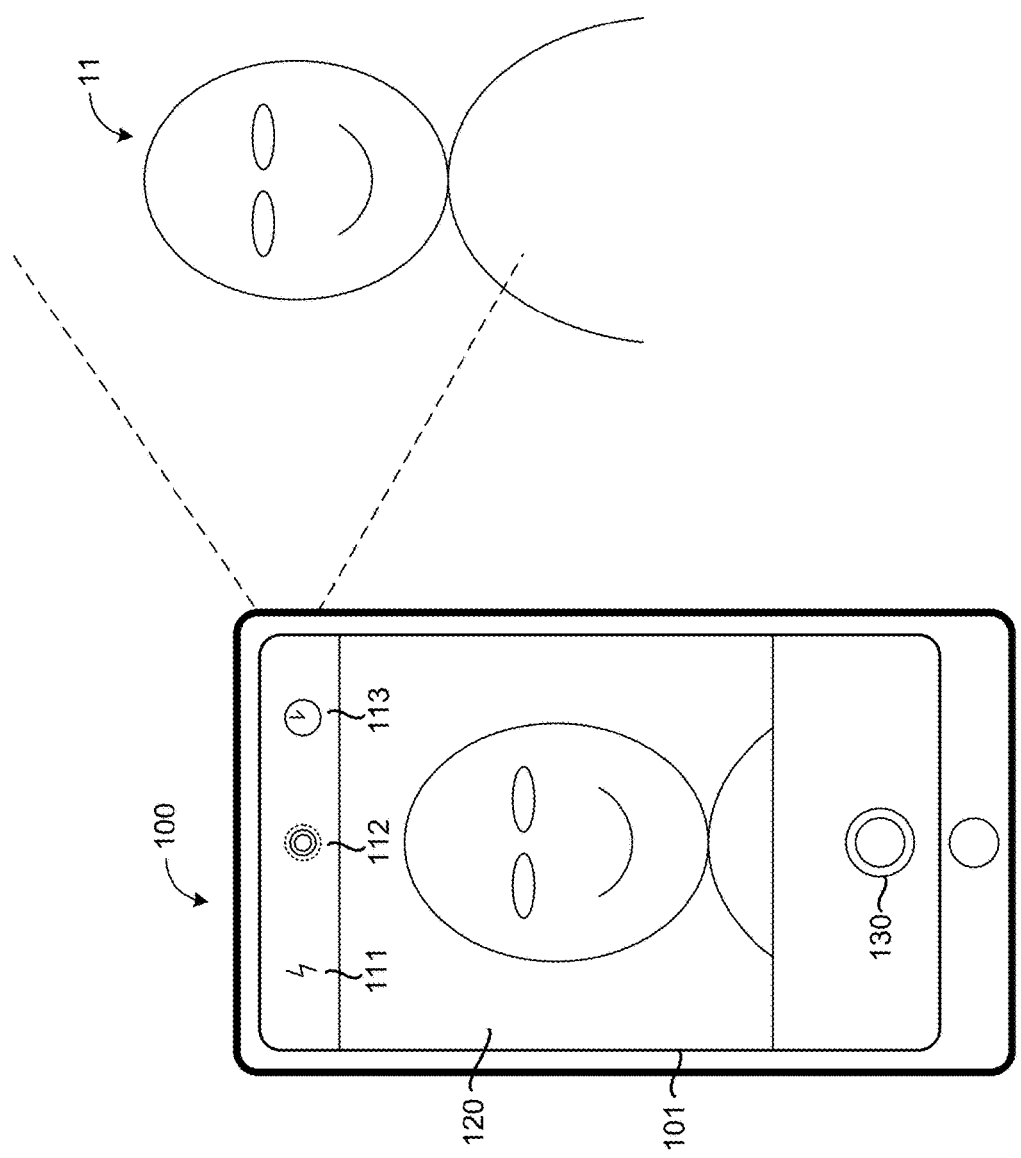
FIG. 6 illustrates the electronic device of FIG. 1 surveying a subject.

FIG. 6 illustrates the electronic device 100 of FIG. 1 surveying a subject 11. As in FIG. 1, the electronic device 100 includes a touch-sensitive display 101 displaying a graphical user interface of an image capture application. The electronic device 100 includes a camera (not shown) having a field of view encompassing the subject 11.

As described above, the graphical user interface displays a number of options affordances 111-113, an image preview window 120, and a capture affordance 130. The image preview window 120 includes a live image of the scene encompassed by the camera's field of view. When the capture affordance 130 is selected (e.g., the location of the capture affordance 130 on the touch-sensitive display 101 is touched by a user), the electronic device 100 captures an image (of the scene depicted in the image preview window 120) using the camera.

As in FIG. 1, the graphical user interface displays a burst affordance 112 that can be used by a user to enter (or exit) a burst photo mode. When in the burst photo mode, the electronic device 100 continually captures a sequence of low-quality images using the camera, saving the most recent set of images in a buffer. In various implementations, the buffer includes approximately 1.5 seconds of images at approximately 15 frames per second. In response to detecting selection of the capture affordance 130, the electronic device captures a high-quality image using the camera and captures another sequence of low-quality images using the camera. In various implementations, the sequence of low-quality images captured after selection of the capture affordance 130 also includes approximately 1.5 seconds of images at 15 frames per second. The electronic device 100 saves the sequence of low-quality images in the buffer, the captured high-quality image, and the sequence of low-quality images captured after the capture affordance 130 was selected. Thus, when in burst photo mode, in response to detecting selection of the capture affordance 130, the electronic device 100 saves a plurality of low-quality images and a single high-quality image. In various implementations, the electronic device captures (and saves) multiple high-quality images, such as an additional high-quality image captured after the second sequence of low-quality images.

Figure 7:
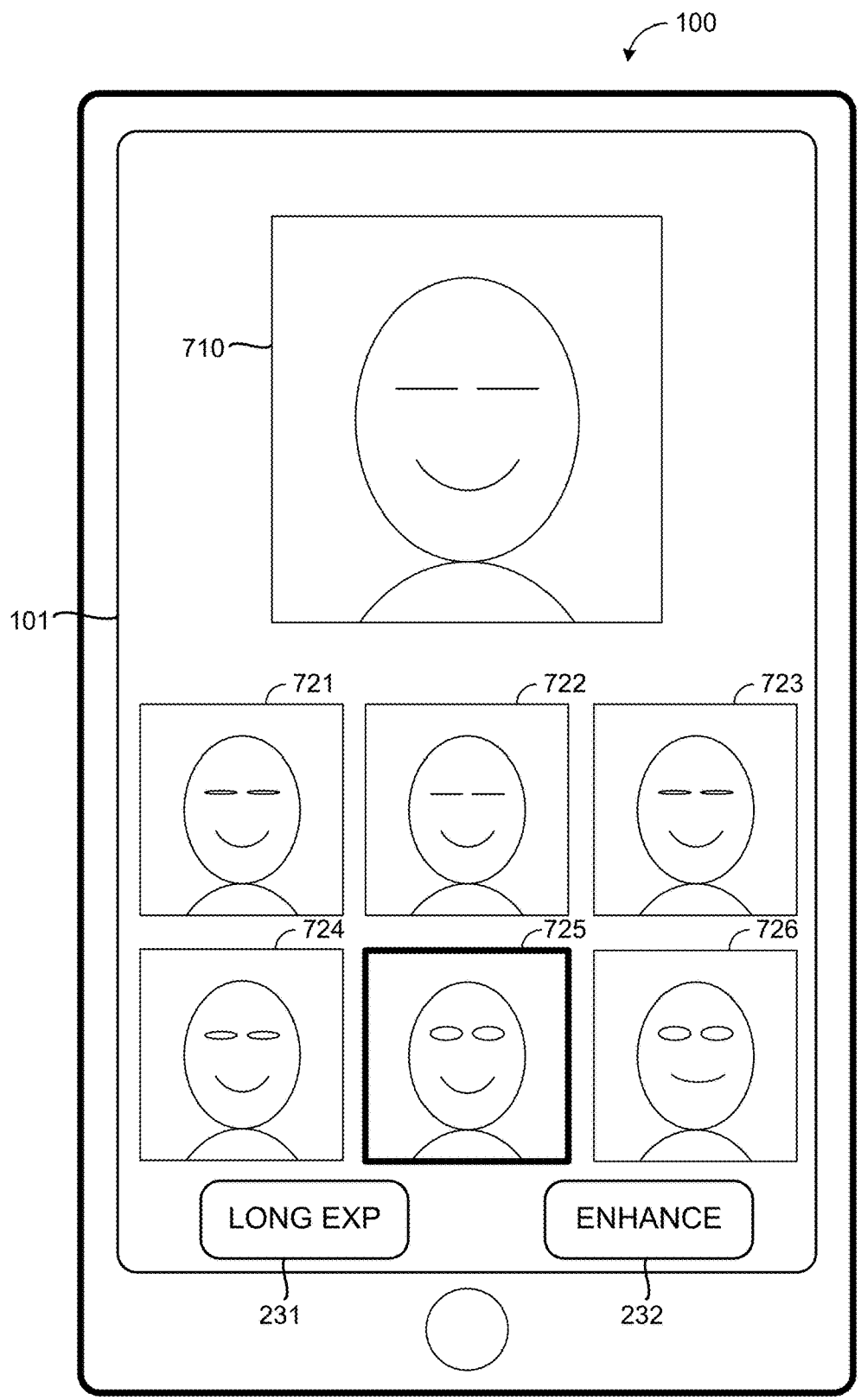
FIG. 7 illustrates the electronic device of FIG. 6 displaying a burst processing user interface on the touch-sensitive display.

FIG. 7 illustrates the electronic device 100 of FIG. 6 displaying the burst processing user interface on the touch-sensitive display 101. The burst processing user interface includes a representation 710 of a high-quality image and representations 721-726 of various low-quality images. As described above, the high-quality image and the low-quality images can be obtained in a burst photo mode. As described above, the burst processing user interface includes a long exposure affordance 231 that, when selected, generates a synthetic long exposure image based on the low-quality images. The burst processing user interface further includes an enhance affordance 232 that, when selected, generates an enhanced image based on a selected one of the low-quality images using the high-quality image as a guide.

The representations 721-726 of the low-quality images illustrate a scene at various points in time. In the representation 721 of the first low-quality image, the subject's eyes are in the process of closing. In the representation 722 of the second low-quality image, the subject's eyes are completely closed. Similarly, in the representation 710 of the high-quality image, the subject's eyes are completely closed. In the representation 723 of the third low-quality image and the representation 724 of the fourth low-quality image, the subject's eyes are in the process of opening. In the representation 725 of the fifth low-quality image, the subject's eyes are open. In the representation 726 of the sixth low-quality image, the subject's eyes are open, but the subject has ceased (or is beginning to cease) smiling. Accordingly, a user can select the fifth low-quality image (e.g., by touching the representation 725 of the fifth low-quality image on the touch-sensitive display 101) as the most contextually relevant image to be enhanced. In some embodiments, upon selection, the representation 725 of the fifth low-quality image indicates that it is selected. For example, in various implementations (and as illustrated in FIG. 7), the representation 725 is highlighted, bordered by a glow, or presented with an overlaid checkmark.

After the representation 725 is selected and a user selects the enhance affordance 232 (e.g., touches the touch-sensitive display 101 at the location of the enhance affordance 232), the electronic device 100 merges the high-quality image and the selected low-quality image.

Figure 8:
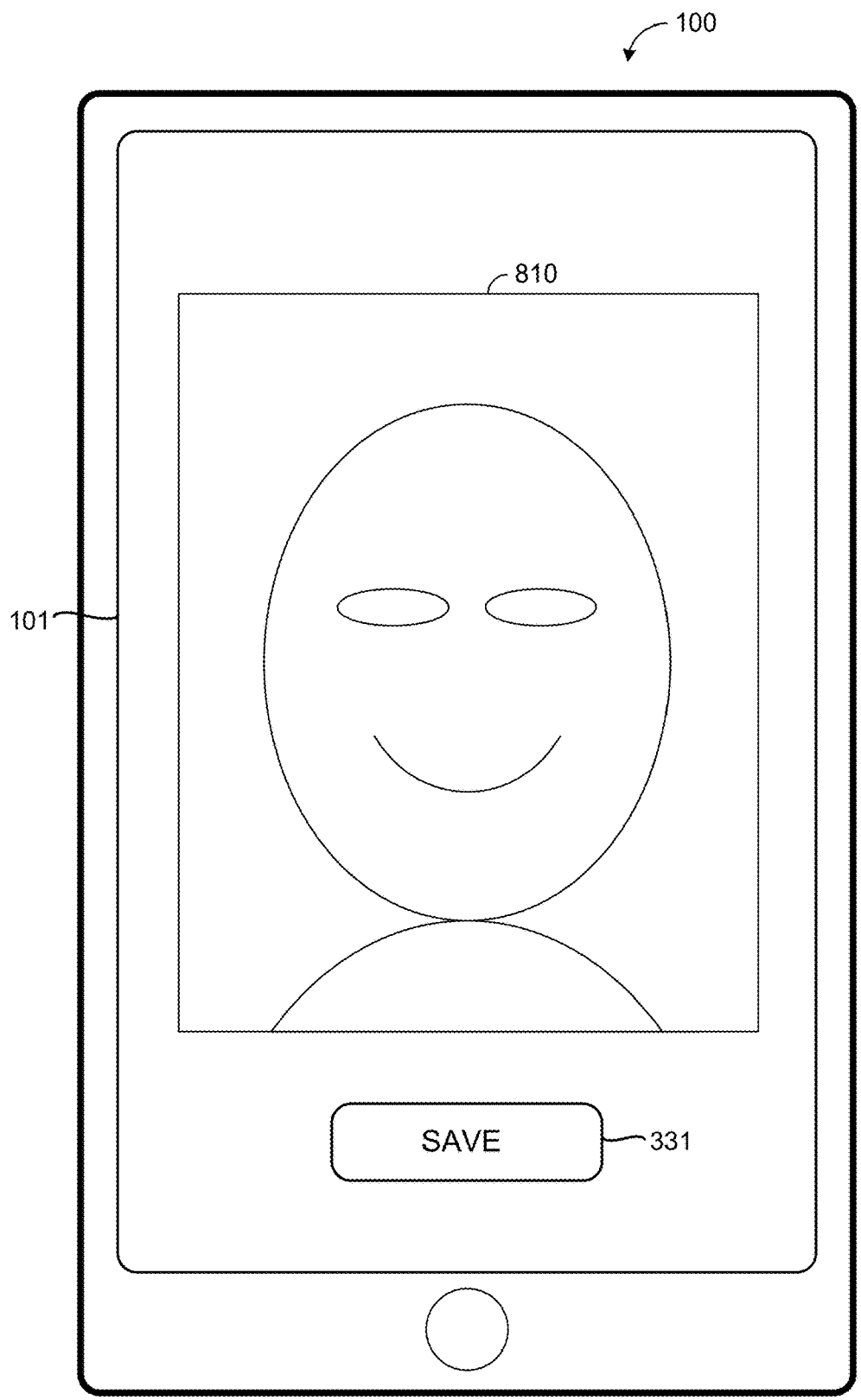
FIG. 8 illustrates the electronic device of FIG. 7 in response to merging a high-quality image and a selected low-quality image.

FIG. 8 illustrates the electronic device 100 of FIG. 7 in response to merging a high-quality image and a selected low-quality image. Displayed on the touch-sensitive display 101 of the electronic device 100 is a representation 810 of a high-quality image of the subject having open eyes and smiling. Also displayed is a save affordance 331 that can be used by a user to save the generated high-quality image in a memory of the electronic device 100.

Figure 9:
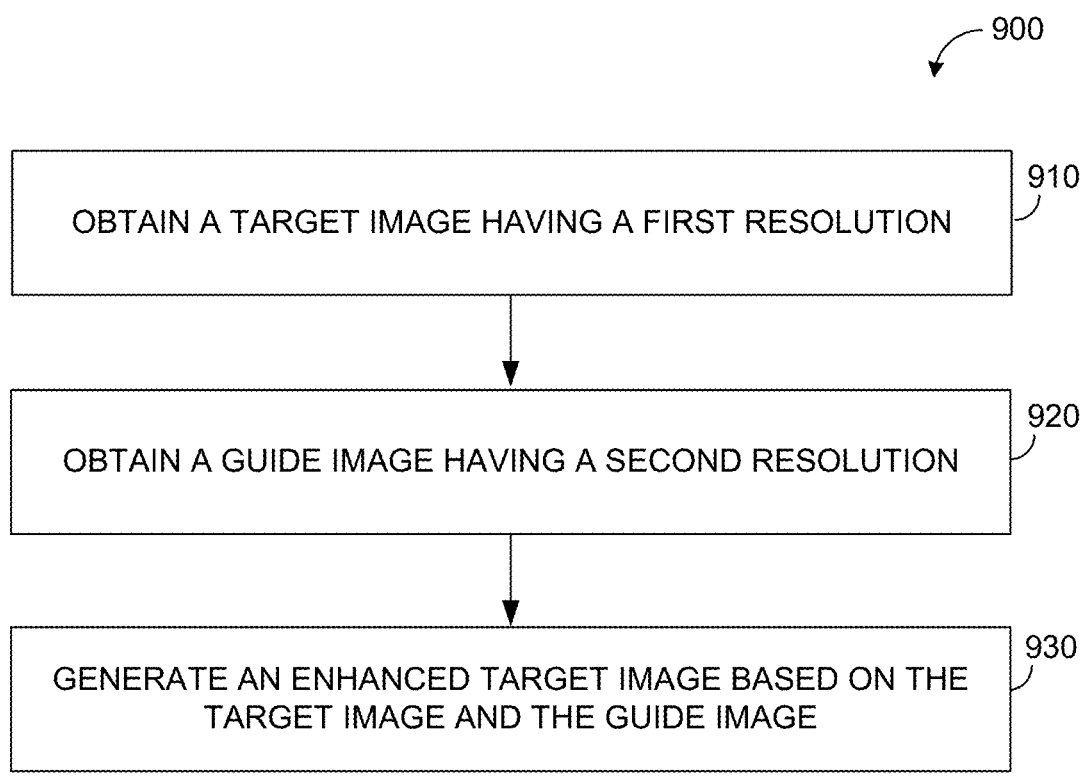
FIG. 9 is a flowchart representation of a method of enhancing the quality of a target image using a guide image in accordance with some implementations.

FIG. 9 is a flowchart representation of a method 900 of enhancing the quality of a target image using a guide image in accordance with some implementations. In some implementations (and as detailed below as an example), the method 900 is performed by an electronic device (or a portion thereof), such as the electronic device 100 of FIG. 1. In some implementations, the method 900 is performed by processing logic, including hardware, firmware, software, or a combination thereof. In some implementations, the method 900 is performed by a processor executing code stored in a non-transitory computer-readable medium (e.g., a memory). Briefly, the method 900 includes obtaining a target image having a first resolution and a guide image having a second resolution and generating an enhanced target image (having the second resolution) based on the target image and the guide image.

The method 900 begins, at block 910, with the electronic device obtaining a target image having a first resolution. The target image comprises a plurality of target pixels having a plurality of corresponding target pixel values. In various implementations, the target pixel values range from 0 to 255. In various implementations, each target pixel is associated with a color triplet of three target pixel values, each corresponding to a color channel. In some embodiments, the target image includes approximately 1.5 megapixels. In various implementations, obtaining the target image includes generating a synthetic long exposure image as described above, e.g., with respect to block 410-430 of FIG. 4.

The method 900 continues, at block 920, with the electronic device obtaining a guide image having a second resolution (higher than the first resolution). The guide image comprises a plurality of guide pixels having a plurality of corresponding guide pixel values. In some embodiments, the guide image includes approximately 12 megapixels.

In various implementations, the target image and/or the guide image are obtained by a camera of the electronic device. For example, in various implementations, the method 900 includes detecting, via an input device of the electronic device, a capture input. In some embodiments, as described above, the capture input is a touch upon the location of a capture affordance displayed on a touch-sensitive display. In response to detecting the capture input, the electronic device captures, via a camera of the electronic device, a high-resolution image of the scene and a sequence of low-resolution images of the scene. The guide image can be the high-resolution image and the target image can be one of the low-resolution images. In some embodiments, obtaining the target image and/or the guide image includes retrieving the image from a memory or over a network.

In various implementations, obtaining the target image includes selecting one of the low-resolution images to be the target image. Thus, in some embodiments, obtaining the target image includes displaying, on a display of the electronic device, a set of potential target images of the sequence of low-resolution images of the scene and receiving, via an input device of the electronic device, a selection of the target image from the set of potential target images. In some embodiments, the display and the input device are integrated as a touch-sensitive display.

In some embodiments, the set of potential target images (shown on the display) comprises all of the sequence of low-resolution images of the scene (e.g., all of the low-resolution images captured in response to detecting the capture input). In some embodiments, the set of potential target images is a proper subset of the sequence of low-resolution images of the scene. In some embodiments, the set of potential target images comprises a downsampled sequence of the sequence of low-resolution images of the scene (e.g., every other image, every third image, or every fifth image).

In some embodiments, the set of potential target images comprises those of the sequence of low-resolution images that can be improved by the high-resolution image. For example, each of the sequence of low-resolution images can be enhanced by the guide image and the result compared with the target image (or the upscaled target image). In those cases in which the enhanced target image differs from the upscaled target image by more than a threshold amount, the electronic device can display target image as one of the set of potential target images.

In various implementations, the camera of the electronic device captures multicolor images, each including multiple color components. In some embodiments, the multicolor image is an RGB image including a red component, a green component, and a blue component. In some embodiments, the multicolor image is a YCbCr image including a luma component, a first chroma component, and a second chroma component. Each component, being a matrix of values, is an "image" having a resolution and a plurality of pixels with corresponding pixel values. Thus, in various implementations, the target image and the guide image can each be a color component of a multicolor image. Similarly, in various implementations, selection of a target image can include selection of a multicolor image including the target image as a color component thereof.

The method 900 continues, at block 930, with the electronic device generating an enhanced target image (having the second resolution) based on the target image and the guide image. The enhanced target image comprises a plurality of enhanced target pixels having a plurality of corresponding enhanced target pixel values. In various implementations, such as when the target image is a synthetic long exposure image, the electronic device generates the enhanced target image based on the target image, the guide image, and a dynamism map. A particular method of generating the enhanced target image is described below with respect to FIG. 10.

In various implementations, following block 930, the method 900 is repeated for each component of a multicolor image. The resulting enhanced target images represent the color components of an enhanced multicolor image.

In various implementations, following block 930, the enhanced target image is saved (e.g., into a non-transitory memory of the electronic device), displayed (e.g., on a display of the electronic device), and/or transmitted (e.g., to a photo printer communicatively coupled to the electronic device).

Figure 10:
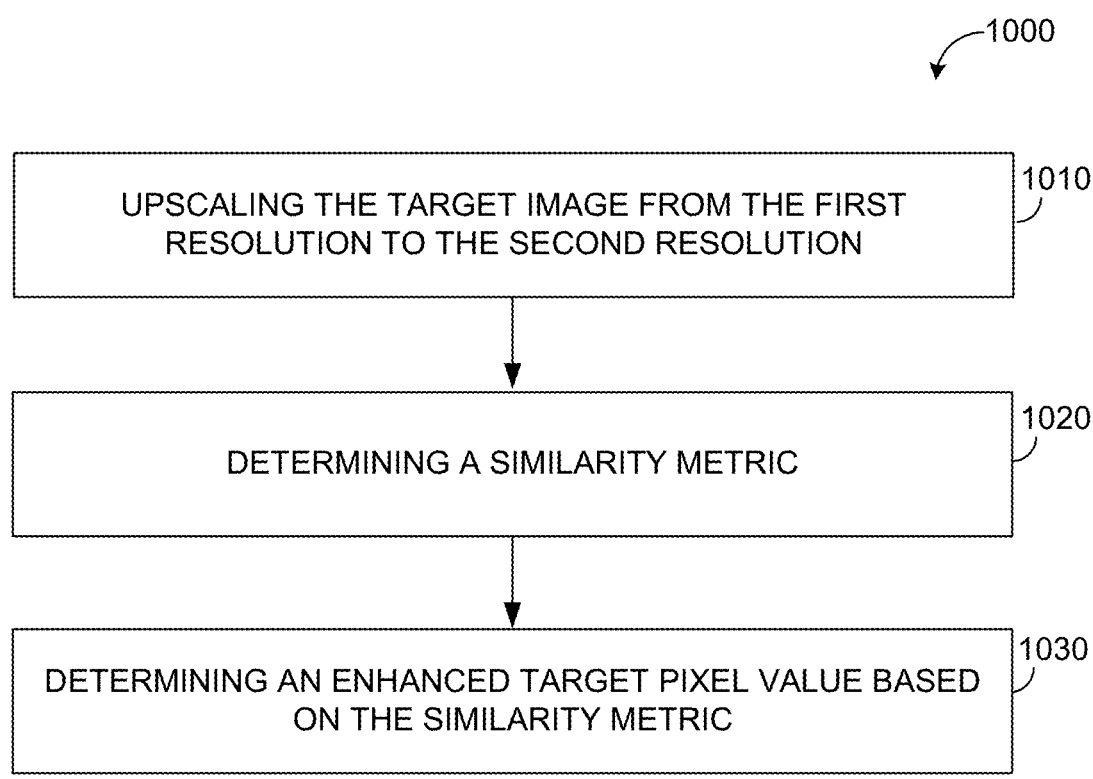
FIG. 10 is a flowchart representation of a method of generating an enhanced target image based on a target image and guide image in accordance with some implementations.

FIG. 10 is a flowchart representation of a method 1000 of generating an enhanced target image based on a target image and guide image in accordance with some implementations. In some implementations (and as detailed below as an example), the method 1000 is performed by an electronic device (or a portion thereof), such as the electronic device 100 of FIG. 1. In some implementations, the method 1000 is performed by processing logic, including hardware, firmware, software, or a combination thereof. In some implementations, the method 1000 is performed by a processor executing code stored in a non-transitory computer-readable medium (e.g., a memory). Briefly, the method 1000 includes determining enhanced target pixel values based on a similarity metric between a region of the target image and corresponding region of the guide image.

The method 1000 begins, at block 1010, with the electronic device upscaling the target image from the first resolution to the second resolution to generate an upscaled target image having the second resolution. The upscaled target image comprises a plurality of upscaled target pixels having a plurality of corresponding upscaled target pixel values.

In various circumstances, although the upscaled target image has the same resolution as the guide image (e.g., the second resolution), the quality of upscaled target image is less than the guide image. In particular, upscaling the target image does not increase the amount of information (e.g., regarding details) of the target image, information that can be provided by the guide image.

The method 1000 continues, in block 1020, with the electronic device determining a similarity metric. In various implementations, the electronic device determines a similarity metric for each pixel of the upscaled target image. In some implementations, however, the electronic device determines a similarity metric for less than all of the pixels of the upscaled target image. For ease of discussion, examples of determining a similarity metric for a single, particular upscaled target pixel are provided below.

For a particular upscaled target pixel, the similarity metric is indicative of the similarity of a neighborhood of pixels around the particular upscaled target pixel to a neighborhood of pixels around a corresponding guide pixel. In many cases, the corresponding guide pixel is the guide pixel at the same location as the upscaled target pixel. However, in some cases, the corresponding guide pixel is not the guide pixel at the same location as the upscaled target pixel. For example, during a capture process the camera (or the subject) can move between capturing a first image and a second image. Thus, as an example, the neighborhood of pixels representing a subject's eye in the upscaled target image may be at location i, whereas the neighborhood of pixels representing the subject's eye in the guide image may be at location $i+\Delta i$. Thus, in various implementations, determining the similarity metric includes determining the corresponding guide pixel, e.g., which guide pixel is the corresponding guide pixel. Such determination can be performed using optical flow algorithms or global alignment algorithms to generate, as between the upscaled target image and the guide image, an alignment map indicating, for each upscaled target pixel, the corresponding guide pixel.

In various implementations, various similarity metrics can be determined. Although a few examples are provided below, other similarity metrics can be used in the method 1000. In some embodiments, the similarity metric is a normalized cross-correlation (NCC). Thus, determining the similarity metric for a particular upscaled target pixel includes determining a normalized cross-correlation between the neighborhood of pixels around the particular upscaled target pixel and the neighborhood of pixels around the corresponding guide pixel.

For an upscaled target pixel at a location i having an upscaled target pixel value of $I_T(i)$, a centered value of the upscaled target pixel (denoted $J_T(i)$) can be determined by subtracting the average of the pixel values of the neighborhood of pixels around the upscaled target pixel (denoted R+i) from the upscaled target pixel value. Thus, $$J_T(i) = I_T(i) - \sum_{j \in R+i} \frac{I_T(j)}{|R+i|}.$$

In various implementations, the neighborhood is a 7×7 square surrounding the pixel. In other implementations, the neighborhood is a 3×3 square, a 5×5 square, or a non-square shape.

The upscaled target pixel has a corresponding guide pixel at a location i+Δi having a guide pixel value of $I_G(i+\Delta i)$. A centered value of the corresponding guide pixel (denoted $J_G(i)$) can be determined by subtracting the average of the pixel values of the neighborhood of pixels around the corresponding guide pixel (denoted R+i+Δi) from the corresponding guide pixel value. Thus, $J_G(i)=I_G(i+\Delta i)-\sum_{j \in R+i+\Delta i} I_G(j)$.

Finally, the normalized cross-correlation (NCC) can be determined as:

$$NCC(i) = \frac{\sum_{j \in R+i} J_T(j) J_G(j)}{\sqrt{\sum_{j \in R+i} J_T^2(j) \sum_{j \in R+i} J_G^2(j)}}.$$

In various implementations, a similarly metric other than a normalized cross-correlation is used. Such embodiment may use less processing power than determining a normalized cross-correlation. In some embodiments, the similarity metric is an absolute difference. Thus, determining the similarity metric for a particular upscaled target pixel includes determining an absolute difference between the neighborhood of pixels around the particular upscaled target pixel and the neighborhood of pixels around the corresponding guide pixel.

For example, the absolute difference can be determined as:

$$AD(i)=\sum_{j \in R+i}|I_T(j)-I_G(j+\Delta i)|.$$

In some embodiments, the similarity metric is a distance. Thus, determining the similarity metric for a particular upscaled target pixel includes determining a distance between the neighborhood of pixels around the particular upscaled target pixel and the neighborhood of pixels around the corresponding guide pixel.

For example, the distance can be determined as:

$$D(i)=\sqrt{\sum_{j \in R+i}(I_T(j)-I_G(j+\Delta i))^2}.$$

In some embodiments, the similarity metric is based on a heuristic. For example, the similarity metric can be a count of the number of pixel values in the neighborhood around the upscaled target pixel that differ by less than a threshold amount from corresponding pixels around the corresponding guide pixel.

In various implementations, the similarity metric is invariant to local yet smooth intensity changes. For example, the NCC is invariant to local yet smooth intensity changes. For a patch of pixels in which the upscaled target image and the guide image share the same content, it can be presumed that the relationship between the two images (at least within the patch of pixels) is $I_G=\alpha I_T+\beta$. Some similarity metrics, such as the NCC, are invariant to α and β.

In various implementations, calculation of the similarity metric for each pixel of a high-resolution image is computationally expensive. Accordingly, in some embodiments, a multiscale scheme is used to determine the similarity metric for each pixel. As an initial step, the similarity metric is determined for each pixel in a first band (e.g., at a first scale). For example, in various implementations, the similarly metric is determined for one pixel in every 4×4 block. For blocks in which the similarity metric is not within an ambiguity range of values, the similarity metric for the one pixel is used for each pixel in the block and no further computation need be done for the block. In an embodiment in which the similarity metric is the NCC, the ambiguity range of values can be between 0 and approximately 1 (e.g., 0.99). Thus, if the similarity metric is less than zero, it can be assumed that because the neighborhoods of the upscaled target image and the guide image around the pixel are so dissimilar, neighborhoods around nearby pixels will also be dissimilar without requiring precise computation. If the similarity metric is greater than approximately one, it can be assumed that because the neighborhoods of the upscaled target image and the guide image around the pixel are so similar, neighborhoods around nearby pixels will also be very similar without requiring precise computation. For blocks in which the similarity metric is within the ambiguity range, similarity metrics are determined in a second band (e.g., at a second scale). For example, in various implementations, the similarity metric is determined for one pixel for each 2×2 block of the 4×4 block). Again, for blocks in which the similarity metric is not within the ambiguity range, the similarity metric is used for each pixel in the block and, for blocks in which the similarity metric is within the ambiguity range, similarity metrics are determined in a third band (e.g., by determining a similarity metric for each pixel of the 2×2 block).

Accordingly, in various implementations, determining the similarity metric includes determining a first similarity metric indicative of the similarity of a neighborhood of pixels around the particular upscaled target pixel in a first band to a neighborhood of pixels around a corresponding guide pixel in the first band and, in response to determining that the first similarity metric is within an ambiguity range of values, determining a second similarity metric indicative of the similarity of a neighborhood of pixels around the particular upscaled target pixel in a second band to a neighborhood of pixels around a corresponding guide pixel in the second band.

The method continues, at block 1030, with the electronic device determining an enhanced target pixel value based on the similarity metric. As noted above, in various implementations, the electronic device determines a similarity metric for each pixel of the upscaled target image. Similarly, in various implementations, the electronic device determines an enhanced target pixel value for each pixel of the upscaled target image (thereby generating the enhanced target image). In some implementations, however, the electronic device determines a similarity metric for less than all of the pixels of the upscaled target image and, similarly, the electronic device determines an enhanced target pixel value (based on the similarity metric) for less than all of the pixels of the upscaled target image. In such cases, the default pixel value for a pixel of the enhanced target image can be the upscaled target pixel value for the pixel. For ease of discussion, examples of determining an enhanced target pixel value based on the similarity metric for a single, particular upscaled target pixel are provided below.

In various implementations, the enhanced target pixel value is a weighted sum of the upscaled target pixel value and the guide pixel value. Thus, in various implementations, determining the enhanced target pixel value comprises determining a weighted sum of the corresponding upscaled target pixel value of the particular upscaled target pixel and the corresponding guide pixel value of the corresponding guide pixel, the sum being weighted by a function of the similarity metric. Accordingly, in various implementations, where the weight at a pixel location i is denoted w(i), the enhanced target pixel value (denoted $I_E(i)$) can be determined as:

$$I_E(i) = w(i) \times I_G(i+\Delta i) + (1-w(i)) \times I_T(i).$$

In various implementations, the weight is the non-negative portion of the normalized cross-correlation (denoted $NCC^+$). The non-negative portion of the normalized cross-correlation is equal to the normalized cross-correlation when the normalized cross-correlation is positive and is equal to zero otherwise. Thus, in various implementations, $$w(i) = NCC^+(i) = \begin{cases} NCC(i) & \text{if } NCC(i) > 0 \\ 0 & \text{otherwise} \end{cases}.$$

In various implementations, such as when the target image is a synthetic long exposure image, the weight is based on the similarity metric and the dynamism map. In various implementations, the dynamism map is filtered to generate a filtered dynamism map. In various implementations, the dynamism map is smoothed by applying a joint bilateral filter (also referred to as a cross bilateral filter) that uses the upscaled target image (e.g., the upscaled synthetic long exposure image) to guide the filtering of the dynamism map. The smoothing corrects small erroneous regions in the map if they are surrounded by correct values, while respecting the edges of the upscaled target image.

In various implementations, the weight is the product of (1) a first sigmoid function of the normalized cross-correlation and (2) one minus a second sigmoid function of the filtered dynamism map. Thus, in various implementations, where $S_1$ and $S_2$ are two sigmoid functions that control the effect of the NCC and the filtered dynamism map on the weight, and $D'_F$ is the filtered dynamism map, $$w(i) = S_1(NCC(i)) \times (1 - S_2(D'_F(i))).$$

In various implementations, the enhanced target pixel value is determined based on the similarity metric (and, optionally, the dynamism map) using methods other than a weighted sum. For example, in some embodiments, the enhanced target pixel value is selected, based on the similarity metric exceeding a threshold, as the guide pixel value or, based on the similarity metric failing to exceed the threshold, the upscaled target pixel value.

In various implementations, the upscaled target image, the guide image, and the enhanced target image include respective high-frequency components and low-frequency components. Thus, in various implementations, the low-frequency component of the enhanced target image is simply the low-frequency component of the target image and the high-frequency component of the enhanced target image is a combination (e.g., a weighted sum) of the high-frequency component of the target image and the high-frequency component of the guide image. Accordingly, in various implementations in which the enhanced target pixel value is based on the upscaled target pixel value and the guide pixel value, it is to be appreciated that this includes methods in which the corresponding pixel value of the high-frequency component of the enhanced target image is based on the corresponding pixel value of the high-frequency component of the upscaled target image and the corresponding pixel value of the high-frequency component of the guide image, e.g., wherein "the target image," "guide image," and/or "enhanced target image" are a frequency component of an image.

In various implementations, enhancing a target image based on a guide image is performed in multiple stages at multiple resolutions. Such a multistage approach has a number of advantages in various circumstances. In various circumstances, a multistage fusion reduces the amount of computation needed to perform the enhancement. In various circumstances, a multistage fusion captures similarities of various sizes or various levels of detail.

Figure 11:
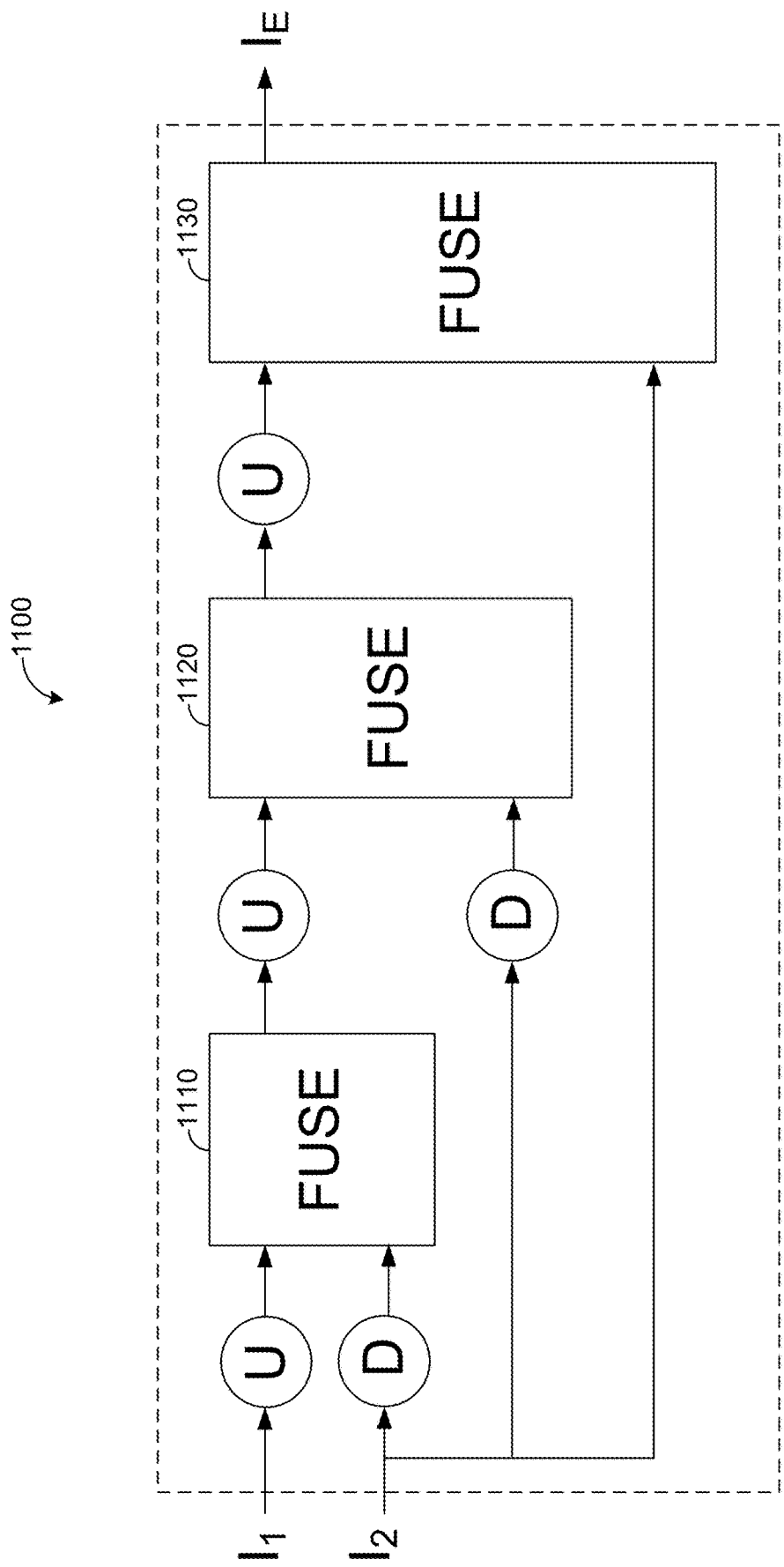
FIG. 11 illustrates a functional block diagram of a multistage image fusion system.

FIG. 11 illustrates a functional block diagram of a multistage image fusion system 1100. The multistage image fusion system 1100 receives, as inputs, a first image having a first resolution and a second image having a second (higher) resolution. The multistage image fusion system outputs an enhanced image having content of the first image at the second resolution.

In a first stage, the multistage image fusion system 1100 upscales the first image to a first intermediate resolution and downscales the second image to the first intermediate resolution. The two images at the first intermediate resolution are fused, by a first fusing block 1110, to create a first fused image. Thus, applying the terminology of FIGS. 9 and 10, the first image corresponds to the target image, the downscaled second image at the first intermediate resolution corresponds to the guide image, and the first fused image corresponds to the enhanced target image. Thus, following the steps set forth in FIGS. 9 and 10, the first fused image is generated by upscaling the first image (to the first intermediate resolution) and determining similarity metrics and first fused pixel values based on the similarity metrics.

In a second stage, the multistage image fusion system 1100 upscales the first fused image to a second intermediate resolution and downscales the second image to the second intermediate resolution. The two images at the second intermediate resolution are fused, by a second fusing block 1120, to create a second fused image. Thus, again applying the terminology of FIGS. 9 and 10, the first fused image corresponds to the target image, the downscaled second image at the second intermediate resolution corresponds to the guide image, and the second fused image corresponds to the enhanced target image. Thus, following the steps set forth in FIGS. 9 and 10, the second fused image is generated by upscaling the first fused image (to the second intermediate resolution) and determining similarity metrics and second fused pixel values based on the similarity metrics.

In a third stage, the multistage image fusion system 1100 upscales the second fused image to a second resolution. The two images at the second resolution (the upscaled second fused image and the unchanged second image) are fused, by a third fusing block 1130, to create the enhanced image. Thus, again applying the terminology of FIGS. 9 and 10, the second fused image corresponds to the target image, the second image corresponds to the guide image, and the enhanced image corresponds to the enhanced target image. Thus, following the steps set forth in FIGS. 9 and 10, the enhanced image is generated by upscaling the second fused image (to the second resolution) and determining similarity metrics and enhanced pixel values based on the similarity metrics.

Thus, in various implementations, generating an enhanced target image based on the target image and the guide image (as described with respect to block 930 of FIG. 9) includes downscaling the guide image from an initial guide image resolution to a plurality of intermediate resolutions. As described with respect to FIG. 11, the multistage image fusion system 1100 downscales the second image from a second resolution to a first intermediate resolution and a second intermediate resolution. Further, generating the enhanced target image further includes generating intermediate fused images, based on the guide image and the target image, at the plurality of intermediate resolutions. As described with respect to FIG. 11, the multistage image fusion system 1100 generates the first fused image and the second fused image.

In various implementations, obtaining the guide image (as described with respect to block 920 of FIG. 9) includes downscaling a pre-guide image having a third resolution (higher than the second resolution) and comprising a plurality of pre-guide pixels having corresponding pre-guide pixel values. For example, in the first stage of FIG. 11, the guide image is a downscaled version of the second image, the target image is the first image, and the enhanced target image is the first fused image. The electronic device (e.g., in the second and/or subsequent stages) generates a further-enhanced target image (e.g., the second fused image or the final enhanced image) based on the enhanced target image (e.g., the first fused image) and the pre-guide image.

In various implementations, obtaining the target image (as described with respect to block 910 of FIG. 9) includes generating the target image based on a pre-target image and the guide image. For example, in the third stage of FIG. 6, the target image is the second fused image (a pre-target image which is based on the first fused image and, indirectly, the first image), the guide image is the second image, and the enhanced target image is the enhanced image.

Figure 12:
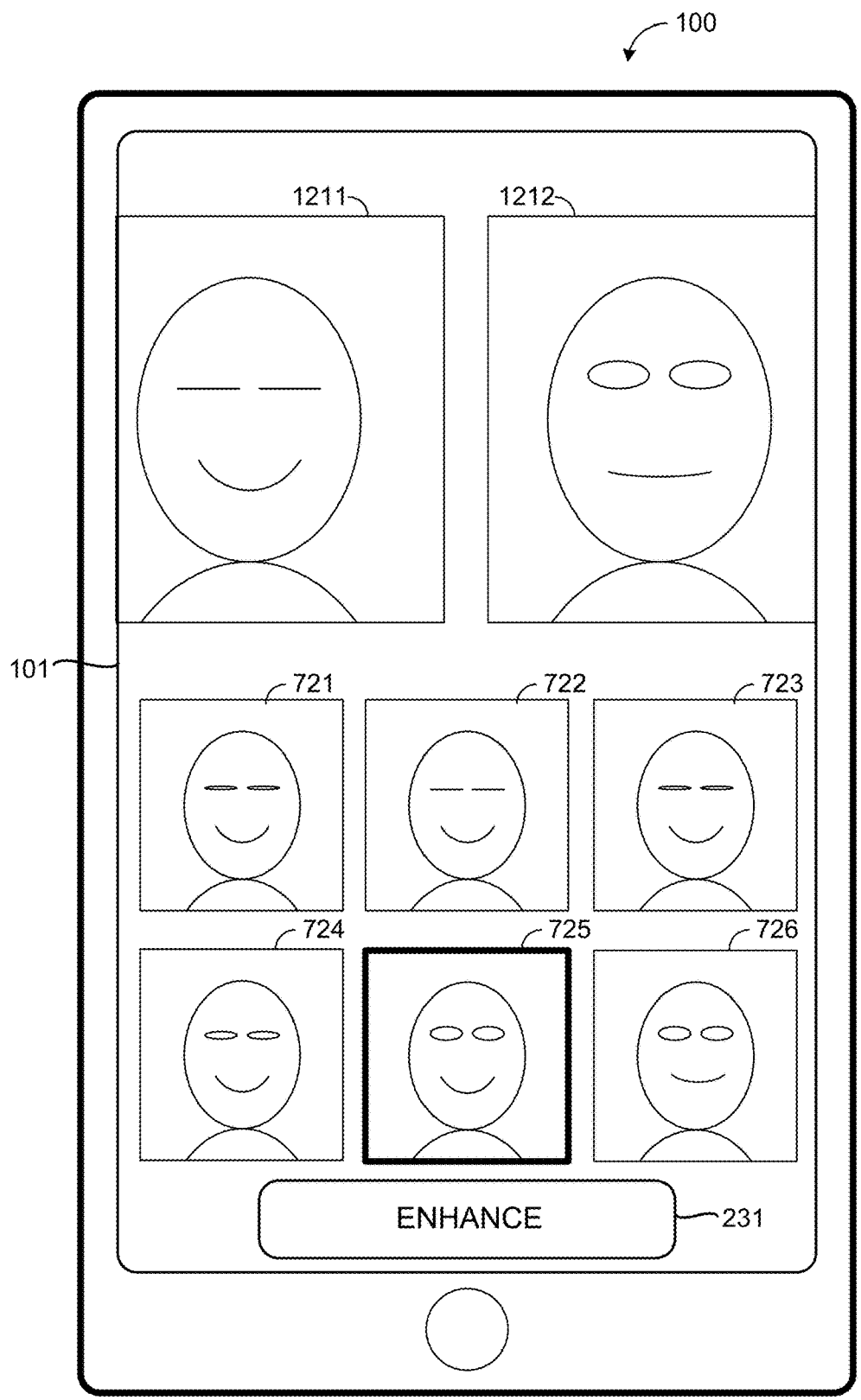
FIG. 12 illustrates the electronic device of FIG. 1 displaying an enhancing user interface on the touch-sensitive display with multiple guide images.

In various implementations, multiple guide images are used to enhance a target image. FIG. 12 illustrates the electronic device 100 of FIG. 1 displaying an enhancing user interface on the touch-sensitive display 101 with multiple guide images. The enhancing user interface includes a representation 1211 of a first high-quality image, a representation 1212 of a second high-quality image, and representations 721-726 of various low-quality images. The enhancing user interface further includes the enhance affordance 231 that, when selected, enhances a selected one of the low-quality images using the high-quality images as a guide.

In various implementations, the enhancing user interface displays only one of the high-quality images (e.g., a high-quality captured when the user selects the capture affordance), but the algorithm executed upon selection of the enhance affordance 231 used multiple high-quality images to enhance the selected low-quality image.

The representations 721-726 of the low-quality images illustrate a scene at various points in time. In the representation 721 of the first low-quality image, the subject's eyes are in the process of closing. In the representation 722 of the second low-quality image, the subject's eyes are completely closed. Similarly, in the representation 1211 of the first high-quality image, the subject's eyes are completely closed. In the representation 723 of the third low-quality image and the representation 724 of the fourth low-quality image, the subject's eyes are in the process of opening. In the representation 725 of the fifth low-quality image, the subject's eyes are open. In the representation 726 of the sixth low-quality image, the subject's eyes are open, but the subject has ceased (or is beginning to cease) smiling. Similarly, in the representation 1212 of the second high-quality image, the subject has ceased to smile.

Accordingly, a user can select the fifth low-quality image (e.g., by touching the representation 725 of the fifth low-quality image on the touch-sensitive display 101) as the most contextually relevant image to be enhanced. In some embodiments, upon selection, the representation 725 of the fifth low-quality image indicates that it is selected. For example, in various implementations (and as illustrated in FIG. 7), the representation 725 is highlighted, bordered by a glow, or presented with an overlaid checkmark.

After the representation 725 is selected and a user selects the enhance affordance 231 (e.g., touches the touch-sensitive display 101 at the location of the enhance affordance 231), the electronic device 100 merges the high-quality images and the selected low-quality image.

Figure 13A:
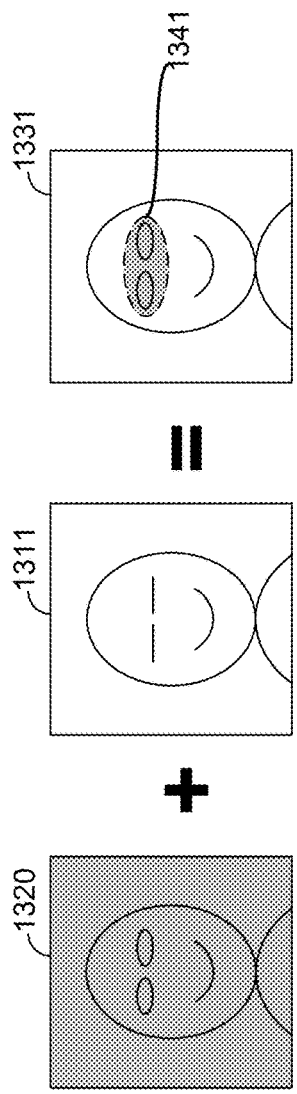
FIGS. 13A-13C illustrate the result of merging high-quality images with one or more selected low-quality images.
Figure 13B:
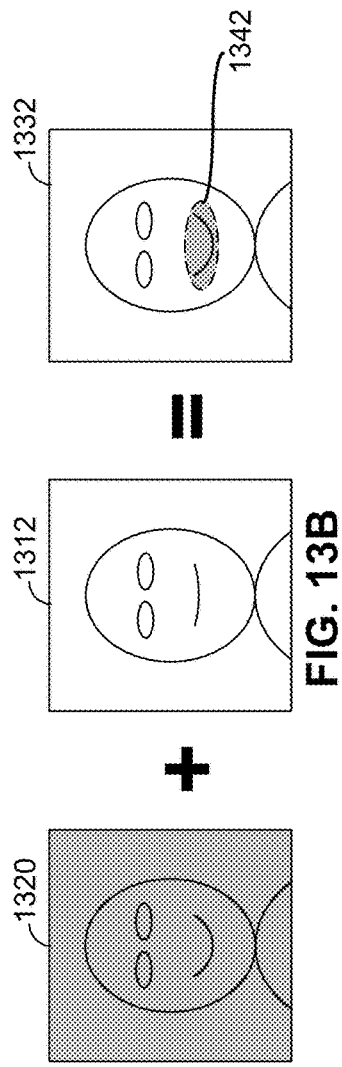
Figure 13C:
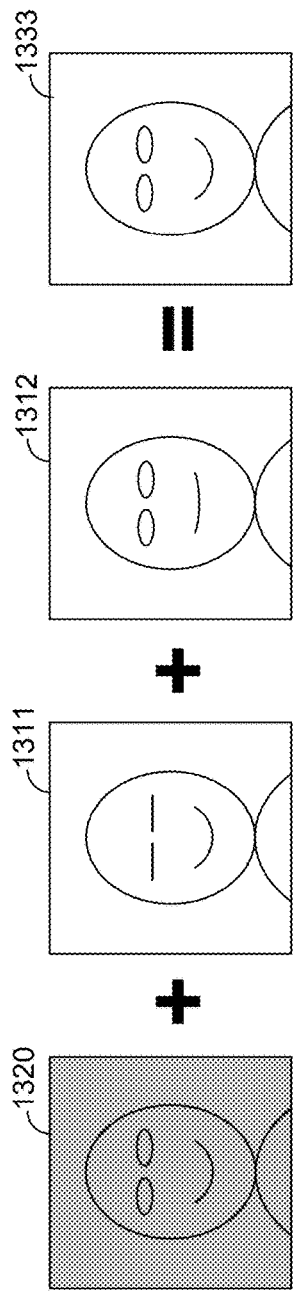

FIGS. 13A-13C illustrate the result of merging high-quality images with one or more selected low-quality images. In FIGS. 13A-13C, quality (e.g., level of detail) is represented by shading, where high-quality images (or portions thereof) are represented without shading and low-quality images (and portions thereof) are represent with shading.

FIG. 13A illustrates that when a low-quality image 1320 (a representation 725 being shown in FIG. 12) is merged with a first high-quality image 1311 (a representation 1211 being shown in FIG. 12), the resulting image 1331 is generally high quality except for a region 1341 around the eyes of the subject. In particular, the information required to generate a high level of detail in the region 1341 of the subject with eyes open is not present in the low-quality image 1320 or the first high-quality image 1311 and, thus, cannot be imported into the resulting image 1331.

FIG. 13B illustrates that when the low-quality image 1320 is merged with a second high-quality image 1312 (a representation 1212 being shown in FIG. 12), the resulting image 1332 is generally high quality except for a region 1342 around the mouth of the subject. In particular, the information required to generate a high level of detail in the region 1342 of the subject smiling is not present in the low-quality image 1320 or the second high-quality image 1312 and, thus, cannot be imported into the resulting image 1332.

FIG. 13C illustrates that when the low-quality image 1320 is merged with both the first high-quality image 1311 and the second high-quality image 1312, the resulting image 1333 is high quality in all regions. The information required to generate a high level of detail in the region 1341 of the subject's eyes is present in the second high-quality image 1312 and the information required to generate a high level of detail in the region 1342 of subject's mouth is present in the first high-quality image 1311.

Accordingly, in various implementations, an electronic device, in addition to obtaining a target image having a first resolution (as described in block 910 of FIG. 9) and obtaining a guide image having a second resolution (as described in block 920 of FIG. 9), obtains a second guide image having the second resolution and comprising a plurality of second guide pixels having corresponding second guide pixel values. The electronic device generates the enhanced target image based on the target image and the guide image (as described in block 930 of FIG. 9) and further based on the second guide image. To that end, the electronic device, in addition to determining, for a particular upscaled target pixel, a similarity metric (as described in block 1020 of FIG. 10), determines, for the particular upscaled target pixel, a second similarity metric indicative of the similarity of the neighborhood of pixels around the particular upscaled target pixel to a neighborhood of pixels around a corresponding second guide pixel. Further, the electronic device determines the enhanced target pixel value based on the similarity metric (as described in block 1030 of FIG. 10) and further based on the second similarity metric.

Determining an enhanced target pixel value using multiple similarity metrics can be performed in any number of ways. In some embodiments, the enhanced target pixel value is further based on the sharpness of the guide image and the second guide image. Thus, in various implementations, determining the enhanced target pixel value is further based on a sharpness of the neighborhood of pixels around the corresponding guide pixel and a sharpness of the neighborhood of pixels around the corresponding second guide pixel.

In some embodiments, the enhanced target pixel value is based on the upscaled target pixel value and only one of the corresponding guide pixel values (e.g., the corresponding guide pixel value of the guide image having the largest similarity metric, the greatest sharpness, or some combination thereof). In some embodiments, the enhanced target pixel value is based on the upscaled target pixel value and multiple corresponding guide pixel values (and, possibly, multiple measures of sharpness).

For example, in one embodiment, the enhanced target pixel value is a weighted sum of the upscaled target pixel value, the corresponding guide pixel value, and the corresponding second guide pixel value, weighted by the non-negative portion of the respective NCC and a sharpness metric (denoted P).

Accordingly, in various implementations, the enhanced target pixel value can be determined as:

$$I_E(i) = P_1(i) \times NCC_1^+(i) \times I_{G1}(i+\Delta i_1) + P_2(i) \times NCC_2^+(i) \times I_{G2}(i+\Delta i_2) + (1 - P_1(i) \times NCC_1^+(i) - P_2(i) \times NCC_2^+(i)) \times I_T(i).$$

Figure 14:
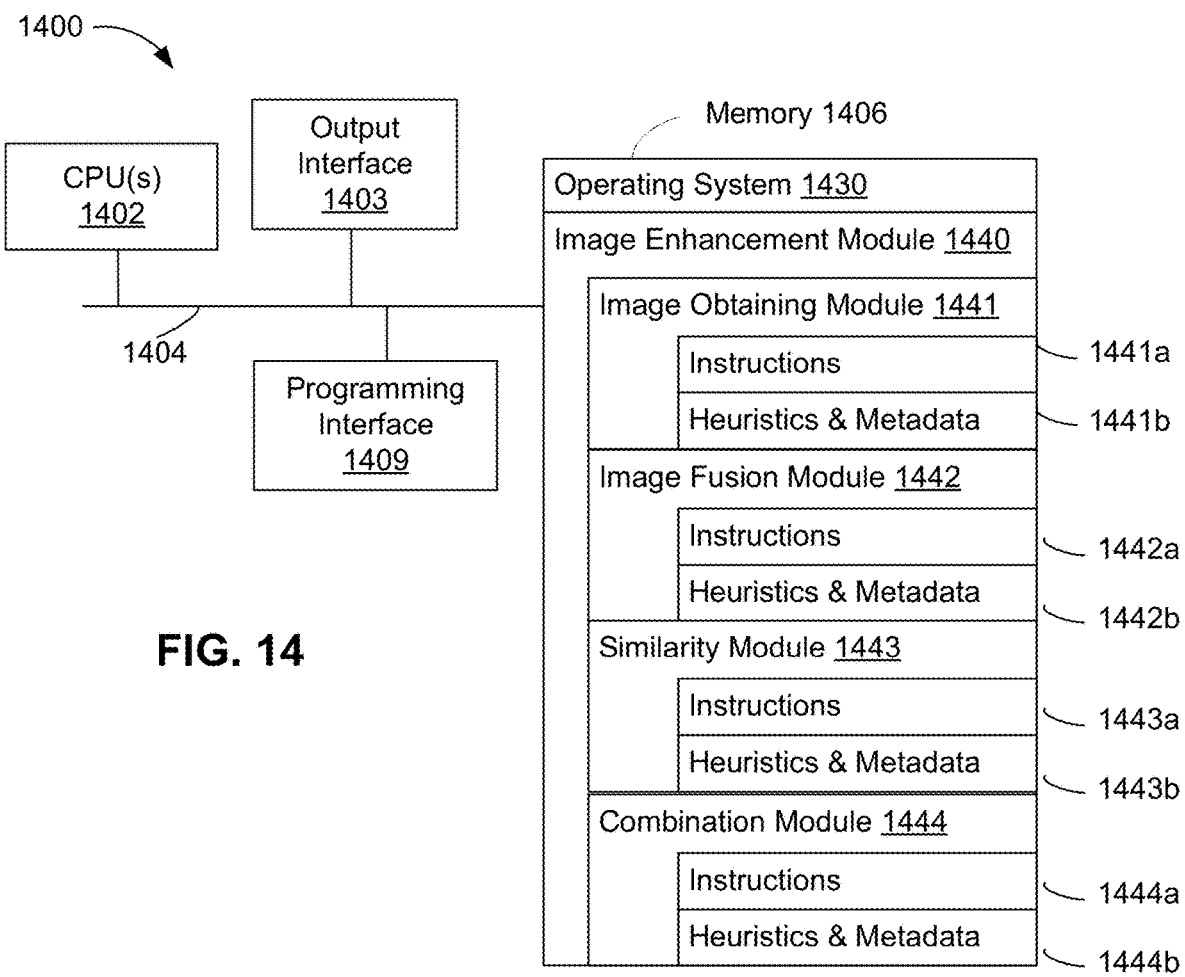
FIG. 14 is a block diagram of a computing device in accordance with some implementations.

FIG. 14 is a block diagram of a computing device 1400 in accordance with some implementations. In some implementations, the computing device 1400 corresponds to at least a portion of the electronic device 100 of FIG. 1 and performs one or more of the functionalities described above with respect to the electronic device. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 1400 includes one or more processing units (CPUs) 1402 (e.g., processors), one or more input/output interfaces 1403 (e.g., a network interface and/or a sensor interface), a memory 1406, a programming interface 1409, and one or more communication buses 1404 for interconnecting these and various other components.

In some implementations, the communication buses 1404 include circuitry that interconnects and controls communications between system components. The memory 1406 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 1406 optionally includes one or more storage devices remotely located from the CPU(s) 1402. The memory 1406 comprises a non-transitory computer readable storage medium. Moreover, in some implementations, the memory 1406 or the non-transitory computer readable storage medium of the memory 1406 stores the following programs, modules and data structures, or a subset thereof including an optional operating system 1430 and an image enhancement module 1440. In some implementations, one or more instructions are included in a combination of logic and non-transitory memory. The operating system 1430 includes procedures for handling various basic system services and for performing hardware dependent tasks. In some implementations, the image enhancement module 1440 is configured to enhance a target image using a guide image. To that end, the image enhancement module 1440 includes an image obtaining module 1441, an image fusion module 1442, a similarity module 1443, and a combination module 1444.

In some implementations, the image obtaining module 1441 is configured to obtain a target image having a first resolution and comprising a plurality of target pixels having a plurality of corresponding target pixel values and configured to obtain a guide image having a second resolution and comprising a plurality of guide pixels having a plurality of corresponding guide pixel values. In some embodiments, the image obtaining module 1441 is configured to generate a synthetic long exposure image by obtaining a plurality of source images, stabilizing the plurality of sources images to generate a plurality of stabilized images, and averaging the plurality of stabilized images to generate a synthetic long exposure image. To that end, the image obtaining module 1441 includes a set of instructions 1441a and heuristics and metadata 1441b.

In some implementations, the image fusion module 1442 is configured to generate an enhanced target image based on the target image and the guide image, the enhanced target image having the second resolution and comprising a plurality of enhanced target pixels having a plurality of corresponding enhanced target pixel values. To that end, the image fusion module 1442 includes a set of instructions 1442a and heuristics and metadata 1442b. In some implementations, in generating the enhanced target image, the image fusion module 1442 is configured to upscale the target image from the first resolution to the second resolution to generate an upscaled target image having the second resolution and comprising a plurality of upscaled target pixels having a plurality of corresponding upscaled target pixel values. In various embodiments, the image fusion module 1442 calls the similarity module 1443 and the combination module 1444. In some implementations, the similarity module 1443 is configured to determine, for a particular upscaled target pixel of the plurality of upscaled target pixels, a similarity metric, wherein the similarity metric is indicative of the similarity of a neighborhood of pixels around the particular upscaled target pixel to a neighborhood of pixels around a corresponding guide pixel. To that end, the similarity module 1443 includes a set of instructions 1443a and heuristics and metadata 1443b. In some implementations, the combination module 1444 is configured to determine, for the particular upscaled target pixel, an enhanced target pixel value based on the similarity metric. To that end, the combination module 1444 includes a set of instructions 1444a and heuristics and metadata 1444b.

Although the image enhancement module 1440, the image obtaining module 1441, the image fusion module 1442, the similarity module 1443, and the combination module 1444 are illustrated as residing on a single computing device 1400, it should be understood that in other embodiments, any combination of the image enhancement module 1440, the image obtaining module 1441, the image fusion module 1442, the similarity module 1443, and the combination module 1444 can reside in separate computing devices in various implementations. For example, in some implementations each of the image enhancement module 1440, the image obtaining module 1441, the image fusion module 1442, the similarity module 1443, and the combination module 1444 reside on a separate computing device or in the cloud.

Moreover, FIG. 14 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 14 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs or GP-GPUs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The invention claimed is:

1. A method comprising:
    obtaining a plurality of source images;
    stabilizing the plurality of source images to generate a plurality of stabilized images;
    averaging the plurality of stabilized image to generate a synthetic long exposure image; and
    generating a dynamism map indicative of a level of pixel value variation of the pixels of the plurality of stabilized images, wherein generating a particular pixel of the dynamism map at a particular pixel location comprises:
        determining one or more pixel values of the plurality of stabilized images in a neighborhood surrounding the particular pixel location; and
        determining a dynamism value of the particular pixel indicative of variation of the one or more pixel values.

2. The method of claim 1, wherein stabilizing the plurality of source images comprises:
    selecting one of the plurality of source images to serve as a reference frame; and
    registering others of the plurality of source images to the reference frame by applying a perspective transformation to others of the plurality of the source images.

3. The method of claim 1, wherein averaging the plurality of stabilized images comprises determining, for at least one pixel of the plurality of stabilized images, a weighted generalized mean.

4. The method of claim 3, wherein a weight of the weighted generalized mean is constant for each of the plurality of stabilized images.

5. The method of claim 1, further comprising:
    obtaining a guide image having a second resolution greater than a first resolution of the synthetic long exposure image; and
    generating an enhanced synthetic long exposure image based on the synthetic long exposure image, the guide image, and the dynamism map.

6. The method of claim 1, wherein determining the one or more pixel values of the plurality of stabilized images within the neighborhood surrounding the particular pixel location comprises:
    determining, for each pixel in the neighborhood of pixels, a maximum pixel value; and
    determining, for each pixel in the neighborhood of pixels, a minimum pixel value;

wherein determining the dynamism value comprises:
  determining, for the particular pixel, a plurality of candidate distance metrics indicative of distances between the maximum pixel values and the minimum pixel values; and
  generating the dynamism value based on the smallest one of the candidate distance metrics.

7. The method of claim 6, wherein the plurality of candidate distance metrics includes a first set of candidate distance metrics indicative of distances between the minimum pixel value of the particular pixel and the maximum pixel values and includes a second set of candidate distance metrics indicative of distances between the maximum pixel value of the particular pixel and the minimum pixel values.

8. The method of claim 6, wherein the plurality of candidate distance metrics includes at least one candidate distance metric indicative of a distance between the minimum pixel value of a first pixel that is not the particular pixel and the maximum pixel value of a second pixel that is not the particular pixel.

9. The method of claim 6, wherein generating the dynamism value based on the smallest one of the candidate distance metrics includes applying a sigmoid function to the smallest one of the candidate distance metrics.

10. The method of claim 6, wherein generating the dynamism value is based on maximum pixel values of a first color channel and minimum pixel values of the first color channel, the method further comprising: generating a first color dynamism value based on the dynamism value and a second color dynamism value based on maximum pixel values of a second color channel and minimum pixel values of the second color channel.

11. A non-transitory computer-readable medium having instructions encoded thereon that, when executed by one or more processors of an electronic device, causes the electronic device to perform a method comprising:
  obtaining a plurality of source images;
  stabilizing the plurality of source images to generate a plurality of stabilized images;
  averaging the plurality of stabilized image to generate a synthetic long exposure image; and
  generating a dynamism map indicative of a level of pixel value variation of the pixels of the plurality of stabilized images, wherein generating a particular pixel of the dynamism map at a particular pixel location comprises:
    determining one or more pixel values of the plurality of stabilized images in a neighborhood surrounding the particular pixel location; and
    determining a dynamism value of the particular pixel indicative of variation of the one or more pixel values.

12. The non-transitory computer-readable medium of claim 11, wherein stabilizing the plurality of source images comprises:
  selecting one of the plurality of source images to serve as a reference frame; and
  registering others of the plurality of source images to the reference frame by applying a perspective transformation to others of the plurality of the source images.

13. The non-transitory computer-readable medium of claim 11, wherein averaging the plurality of stabilized images comprises determining, for at least one pixel of the plurality of stabilized images, a weighted generalized mean.

14. The non-transitory computer-readable medium of claim 13, wherein a weight of the weighted generalized mean is constant for each of the plurality of stabilized images.

15. The non-transitory computer-readable medium of claim 11, wherein determining the one or more pixel values of the plurality of stabilized images within the neighborhood surrounding the particular pixel location comprises:
  determining, for each pixel in the neighborhood of pixels, a maximum pixel value; and
  determining, for each pixel in the neighborhood of pixels, a minimum pixel value;
  wherein determining the dynamism value comprises:
    determining, for the particular pixel, a plurality of candidate distance metrics indicative of distances between the maximum pixel values and the minimum pixel values; and
    generating the dynamism value based on the smallest one of the candidate distance metrics.

16. The non-transitory computer-readable medium of claim 15, wherein the plurality of candidate distance metrics includes a first set of candidate distance metrics indicative of distances between the minimum pixel value of the particular pixel and the maximum pixel values and includes a second set of candidate distance metrics indicative of distances between the maximum pixel value of the particular pixel and the minimum pixel values.

17. The non-transitory computer-readable medium of claim 15, wherein the plurality of candidate distance metrics includes at least one candidate distance metric indicative of a distance between the minimum pixel value of a first pixel that is not the particular pixel and the maximum pixel value of a second pixel that is not the particular pixel.

18. The non-transitory computer-readable medium of claim 11, wherein determining the one or more pixel values of the plurality of stabilized images within the neighborhood surrounding the particular pixel location comprises:
  determining, for each pixel in the neighborhood of pixels, a maximum pixel value; and
  determining, for each pixel in the neighborhood of pixels, a minimum pixel value;
  wherein determining the dynamism value comprises:
    determining, for the particular pixel, a plurality of candidate distance metrics indicative of distances between the maximum pixel values and the minimum pixel values; and
    generating the dynamism value based on the smallest one of the candidate distance metrics.

19. The non-transitory computer-readable medium of claim 11, further comprising:
  obtaining a guide image having a second resolution greater than a first resolution of the synthetic long exposure image; and
  generating an enhanced synthetic long exposure image based on the synthetic long exposure image, the guide image, and the dynamism map.

20. An electronic device comprising:
  a non-transitory memory; and
  one or more processors configured to:
    obtain a plurality of source images;
    stabilize the plurality of source images to generate a plurality of stabilized images;
    average the plurality of stabilized image to generate a synthetic long exposure image; and
    generate a dynamism map indicative of a level of pixel value variation of the pixels of the plurality of stabilized images, wherein generating a particular pixel of the dynamism map at a particular pixel location comprises:

determining one or more pixel values of the plurality of stabilized images in a neighborhood surrounding the particular pixel location; and determining a dynamism value of the particular pixel indicative of variation of the one or more pixel values.

\* \* \* \* \*